United States Patent
Kim et al.

(10) Patent No.: US 12,543,183 B2
(45) Date of Patent: Feb. 3, 2026

(54) RESOURCE ALLOCATION METHOD AND DEVICE FOR ENHANCING RECEPTION PERFORMANCE OF UPLINK CONTROL CHANNEL IN WIRELESS COMMUNICATION SYSTEM

(71) Applicant: Samsung Electronics Co., Ltd., Suwon-si (KR)

(72) Inventors: Yeongsam Kim, Suwon-si (KR); Hayoung Yang, Suwon-si (KR); Youngkwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 18/307,261

(22) Filed: Apr. 26, 2023

(65) Prior Publication Data

US 2023/0262714 A1 Aug. 17, 2023

Related U.S. Application Data

(63) Continuation of application No. PCT/KR2021/014646, filed on Oct. 20, 2021.

(30) Foreign Application Priority Data

Nov. 13, 2020 (KR) .................... 10-2020-0151570

(51) Int. Cl.
*H04W 72/21* (2023.01)
*H04W 72/0446* (2023.01)
*H04W 72/0453* (2023.01)

(52) U.S. Cl.
CPC ....... *H04W 72/21* (2023.01); *H04W 72/0446* (2013.01); *H04W 72/0453* (2013.01)

(58) Field of Classification Search
CPC ............ H04W 72/21; H04W 72/0446; H04W 72/0453; H04W 72/51; H04L 5/00; H04L 5/0053; H04L 5/0016
See application file for complete search history.

(56) References Cited

U.S. PATENT DOCUMENTS 9,025,560 B2  5/2015  Han et al.
9,980,256 B2  5/2018  Zhao et al.
(Continued)

FOREIGN PATENT DOCUMENTS

CN  110034903 A  7/2019
KR  101783610 B1  7/2010
(Continued)

OTHER PUBLICATIONS

International Search Report dated Jan. 25, 2022, issued in an International Application No. PCT/KR2021/014646.
(Continued)

*Primary Examiner* — Brian T O Connor
(74) *Attorney, Agent, or Firm* — Jefferson IP Law, LLP

(57) ABSTRACT

The disclosure relates to a communication technique for merging internet of things (IoT) technology with a 5th generation (5G) communication system for supporting a data transmission rate higher than that of a 4th generation (4G) system, and a system therefor. The disclosure is applied to intelligent service based on 5G communication technology and IoT-related technology. A method for enhancing physical uplink control channel (PUCCH) reception performance, and a device therefor are provided. The method includes receiving, from a terminal, a signal for determining environment information of the terminal, identifying the environment information of the terminal based on the signal, identifying resource allocation information for a physical uplink control channel (PUCCH) format 1 signal based on the environment information of the terminal, transmitting (Continued)

the resource allocation information to the terminal, and receiving the PUCCH format 1 signal from the terminal based on the resource allocation information.

15 Claims, 17 Drawing Sheets

(56) References Cited

U.S. PATENT DOCUMENTS

| | | | |
|---|---|---|---|
| 10,212,708 B2 | 2/2019 | Taylor | |
| 10,367,620 B2 | 7/2019 | Iyer et al. | |
| 10,638,463 B2 | 4/2020 | Park | |
| 11,489,706 B2 | 11/2022 | Gao et al. | |
| 11,856,415 B2 * | 12/2023 | Jassal | H04W 36/085 |
| 11,956,745 B2 | 4/2024 | Laddu et al. | |
| 12,273,887 B2 * | 4/2025 | Li | H04W 72/56 |
| 2019/0150169 A1 | 5/2019 | Wang et al. | |
| 2020/0037298 A1 | 1/2020 | Shi et al. | |
| 2020/0221444 A1 * | 7/2020 | Tiirola | H04W 72/21 |
| 2020/0236672 A1 | 7/2020 | Myung et al. | |
| 2020/0351129 A1 | 11/2020 | Kwak et al. | |
| 2021/0168846 A1 * | 6/2021 | Li | H04L 5/0055 |
| 2022/0046635 A1 * | 2/2022 | Liou | H04B 7/0691 |
| 2022/0061117 A1 * | 2/2022 | Liou | H04W 76/19 |
| 2022/0182957 A1 * | 6/2022 | Laddu | H04L 5/0094 |
| 2022/0321292 A1 * | 10/2022 | Matsumura | H04L 5/0048 |
| 2023/0050608 A1 * | 2/2023 | Tsai | H04W 72/21 |
| 2023/0239853 A1 * | 7/2023 | Chung | H04L 1/00 370/329 |

FOREIGN PATENT DOCUMENTS

| | | |
|---|---|---|
| KR | 10-2012-0085045 A | 7/2012 |
| KR | 10-2020-0002488 A | 1/2020 |
| KR | 10-2020-0037385 A | 4/2020 |
| KR | 102117968 B1 | 6/2020 |
| WO | 2018/229731 A1 | 12/2018 |
| WO | 2019/027995 A1 | 2/2019 |
| WO | 2020/194103 A1 | 10/2020 |

OTHER PUBLICATIONS

Moderator (OPPO); Summary#1 of email thread [102-e-NR-L1enh_URLLC-UCI_Enh-02]; 3GPP TSG RAN WG1 #102-e; R1-2007054; Aug. 20, 2020.
Evolved Universal Terrestrial Radio Access (E-UTRA) Physical channels and modulation, 3GPP TS 36.211 V15.11.0, Oct. 1, 2020.
Korean Office Action dated Oct. 14, 2025, issued in Korean Application No. 10-2020-0151570.

* cited by examiner

— Nos = 1

— Nue = 4

| OS | CS |
|----|----|
| 0  | 0  |
| 0  | 6  |
| 0  | 3  |
| 0  | 9  |

— Nue = 6

| OS | CS |
|----|----|
| 0  | 0  |
| 0  | 6  |
| 0  | 2  |
| 0  | 8  |
| 0  | 4  |
| 0  | 10 |

FIG. 5

– Nos = 2

– Nue = 8

| OS | CS |
|---|---|
| 0 | 0 |
| 0 | 6 |
| 0 | 3 |
| 0 | 9 |
| 1 | 4 |
| 1 | 7 |
| 1 | 10 |
| 1 | 1 |

– Nue = 12

| OS | CS |
|---|---|
| 0 | 0 |
| 0 | 2 |
| 0 | 4 |
| 0 | 6 |
| 0 | 8 |
| 0 | 10 |
| 1 | 3 |
| 1 | 5 |
| 1 | 7 |
| 1 | 9 |
| 1 | 11 |
| 1 | 1 |

FIG. 6

- Nos = 3

| - Nue = 4 | |
|---|---|
| OS | CS |
| 0 | 0 |
| 0 | 6 |
| 1 | 3 |
| 2 | 9 |

| - Nue = 8 | |
|---|---|
| OS | CS |
| 0 | 0 |
| 0 | 4 |
| 0 | 8 |
| 1 | 3 |
| 1 | 7 |
| 1 | 11 |
| 2 | 6 |
| 2 | 10 |

| - Nue = 12 | |
|---|---|
| OS | CS |
| 0 | 0 |
| 0 | 3 |
| 0 | 6 |
| 0 | 9 |
| 1 | 4 |
| 1 | 7 |
| 1 | 10 |
| 1 | 1 |
| 2 | 8 |
| 2 | 11 |
| 2 | 2 |
| 2 | 5 |

| - Nue = 18 | |
|---|---|
| OS | CS |
| 0 | 0 |
| 0 | 2 |
| 0 | 4 |
| 0 | 6 |
| 0 | 8 |
| 0 | 10 |
| 1 | 3 |
| 1 | 5 |
| 1 | 7 |
| 1 | 9 |
| 1 | 11 |
| 1 | 1 |
| 2 | 6 |
| 2 | 8 |
| 2 | 10 |
| 2 | 0 |
| 2 | 2 |
| 2 | 4 |

FIG. 7

- Nos = 7

| - Nue = 8 | | - Nue = 18 | | - Nue = 30 | | - Nue = 42 | | | |
|---|---|---|---|---|---|---|---|---|---|
| OS | CS | OS | CS | OS | CS | OS | CS | OS | CS |
| 0 | 0 | 0 | 0 | 0 | 0 | 0 | 0 | 5 | 3 |
| 0 | 6 | 0 | 4 | 0 | 2 | 0 | 2 | 5 | 5 |
| 1 | 5 | 0 | 8 | 0 | 4 | 0 | 4 | 5 | 7 |
| 2 | 10 | 1 | 3 | 0 | 6 | 0 | 6 | 5 | 9 |
| 3 | 3 | 1 | 7 | 0 | 8 | 0 | 8 | 5 | 11 |
| 4 | 8 | 1 | 11 | 1 | 3 | 0 | 10 | 5 | 1 |
| 5 | 1 | 2 | 6 | 1 | 5 | 1 | 3 | 6 | 6 |
| 6 | 6 | 2 | 10 | 1 | 7 | 1 | 5 | 6 | 8 |
| | | 2 | 2 | 1 | 9 | 1 | 7 | 6 | 10 |
| | | 3 | 9 | 1 | 11 | 1 | 9 | 6 | 0 |
| | | 3 | 1 | 2 | 6 | 1 | 11 | 6 | 2 |
| | | 3 | 5 | 2 | 8 | 1 | 1 | 6 | 4 |
| | | 4 | 0 | 2 | 10 | 2 | 6 | | |
| | | 4 | 4 | 2 | 0 | 2 | 8 | | |
| | | 5 | 3 | 3 | 9 | 2 | 10 | | |
| | | 5 | 7 | 3 | 11 | 2 | 0 | | |
| | | 6 | 6 | 3 | 1 | 2 | 2 | | |
| | | 6 | 10 | 3 | 3 | 2 | 4 | | |
| | | | | 4 | 0 | 3 | 9 | | |
| | | | | 4 | 2 | 3 | 11 | | |
| | | | | 4 | 4 | 3 | 1 | | |
| | | | | 4 | 6 | 3 | 3 | | |
| | | | | 5 | 3 | 3 | 5 | | |
| | | | | 5 | 5 | 3 | 7 | | |
| | | | | 5 | 7 | 4 | 0 | | |
| | | | | 5 | 9 | 4 | 2 | | |
| | | | | 6 | 6 | 4 | 4 | | |
| | | | | 6 | 8 | 4 | 6 | | |
| | | | | 6 | 10 | 4 | 8 | | |
| | | | | 6 | 0 | 4 | 10 | | |

FIG. 8

| | Erasure or False alarm | | | |
|---|---|---|---|---|
| | UE0 | UE1 | UE2 | UE3 |
| | DTX | TX | TX | TX |
| -9 | 0.72% | 0.32% | 0.22% | 0.26% |
| -6 | 1.00% | 0.01% | 0.00% | 0.01% |
| -3 | 1.62% | 0.00% | 0.00% | 0.00% |
| 0 | 3.68% | 0.00% | 0.00% | 0.00% |

| | Erasure or False alarm | | | |
|---|---|---|---|---|
| | UE0 | UE1 | UE2 | UE3 |
| | DTX | DTX | TX | TX |
| -9 | 0.62% | 0.73% | 0.21% | 0.24% |
| -6 | 0.67% | 0.78% | 0.00% | 0.00% |
| -3 | 0.83% | 0.97% | 0.00% | 0.00% |
| 0 | 1.18% | 1.46% | 0.00% | 0.00% |

| | Erasure or False alarm | | | |
|---|---|---|---|---|
| | UE0 | UE1 | UE2 | UE3 |
| | DTX | TX | DTX | TX |
| -9 | 0.78% | 0.27% | 0.85% | 0.23% |
| -6 | 1.06% | 0.01% | 1.10% | 0.00% |
| -3 | 1.84% | 0.00% | 1.94% | 0.00% |
| 0 | 4.40% | 0.00% | 4.44% | 0.00% |

| | Erasure or False alarm | | | |
|---|---|---|---|---|
| | UE0 | UE1 | UE2 | UE3 |
| | DTX | DTX | DTX | TX |
| -9 | 0.65% | 0.69% | 0.74% | 0.23% |
| -6 | 0.75% | 0.71% | 0.88% | 0.01% |
| -3 | 0.96% | 0.79% | 1.18% | 0.00% |
| 0 | 1.53% | 0.94% | 2.16% | 0.00% |

FIG. 9

| | Erasure or False alarm | | | |
|---|---|---|---|---|
| | UE0 | UE1 | UE2 | UE3 |
| | DTX | TX | TX | TX |
| -9 | 0.35% | 0.36% | 0.25% | 0.32% |
| -6 | 0.23% | 0.01% | 0.01% | 0.00% |
| -3 | 0.12% | 0.00% | 0.00% | 0.00% |
| 0 | 0.04% | 0.00% | 0.00% | 0.00% |

| | Erasure or False alarm | | | |
|---|---|---|---|---|
| | UE0 | UE1 | UE2 | UE3 |
| | DTX | DTX | TX | TX |
| -9 | 0.42% | 0.44% | 0.22% | 0.29% |
| -6 | 0.29% | 0.29% | 0.00% | 0.00% |
| -3 | 0.18% | 0.12% | 0.00% | 0.00% |
| 0 | 0.07% | 0.04% | 0.00% | 0.00% |

| | Erasure or False alarm | | | |
|---|---|---|---|---|
| | UE0 | UE1 | UE2 | UE3 |
| | DTX | TX | DTX | TX |
| -9 | 0.43% | 0.31% | 0.47% | 0.30% |
| -6 | 0.34% | 0.01% | 0.32% | 0.00% |
| -3 | 0.22% | 0.00% | 0.18% | 0.00% |
| 0 | 0.13% | 0.00% | 0.05% | 0.00% |

| | Erasure or False alarm | | | |
|---|---|---|---|---|
| | UE0 | UE1 | UE2 | UE3 |
| | DTX | DTX | DTX | TX |
| -9 | 0.47% | 0.53% | 0.55% | 0.27% |
| -6 | 0.40% | 0.44% | 0.45% | 0.00% |
| -3 | 0.31% | 0.30% | 0.32% | 0.00% |
| 0 | 0.20% | 0.15% | 0.18% | 0.00% |

FIG. 10

|  | Erasure or False alarm | | | |
| --- | --- | --- | --- | --- |
|  | UE0 | UE1 | UE2 | UE3 |
|  | DTX | TX | TX | TX |
| -9 | 3.09% | 0.39% | 0.45% | 0.37% |
| -6 | 8.30% | 0.01% | 0.01% | 0.01% |
| -3 | 19.95% | 0.00% | 0.00% | 0.00% |
| 0 | 34.15% | 0.00% | 0.00% | 0.00% |

|  | Erasure or False alarm | | | |
| --- | --- | --- | --- | --- |
|  | UE0 | UE1 | UE2 | UE3 |
|  | DTX | DTX | TX | TX |
| -9 | 3.38% | 0.44% | 0.39% | 0.34% |
| -6 | 9.43% | 0.28% | 0.01% | 0.00% |
| -3 | 23.06% | 0.13% | 0.00% | 0.00% |
| 0 | 38.37% | 0.04% | 0.00% | 0.00% |

FIG. 11

|  | Erasure or False alarm ||||
|---|---|---|---|---|
|  | UE0 | UE1 | UE2 | UE3 |
|  | DTX | TX | TX | TX |
| -9 | 0.33% | 0.41% | 0.35% | 0.37% |
| -6 | 0.20% | 0.00% | 0.01% | 0.02% |
| -3 | 0.09% | 0.00% | 0.00% | 0.00% |
| 0 | 0.02% | 0.00% | 0.00% | 0.00% |

|  | Erasure or False alarm ||||
|---|---|---|---|---|
|  | UE0 | UE1 | UE2 | UE3 |
|  | DTX | DTX | TX | TX |
| -9 | 0.40% | 0.42% | 0.31% | 0.33% |
| -6 | 0.29% | 0.30% | 0.00% | 0.01% |
| -3 | 0.15% | 0.15% | 0.00% | 0.00% |
| 0 | 0.06% | 0.06% | 0.00% | 0.00% |

|  | Erasure or False alarm ||||
|---|---|---|---|---|
|  | UE0 | UE1 | UE2 | UE3 |
|  | DTX | TX | DTX | TX |
| -9 | 0.36% | 0.37% | 0.44% | 0.35% |
| -6 | 0.25% | 0.00% | 0.28% | 0.01% |
| -3 | 0.11 | 0.00% | 0.12% | 0.00% |
| 0 | 0.05% | 0.00% | 0.02% | 0.00% |

|  | Erasure or False alarm ||||
|---|---|---|---|---|
|  | UE0 | UE1 | UE2 | UE3 |
|  | DTX | DTX | DTX | TX |
| -9 | 0.44% | 0.47% | 0.54% | 0.30% |
| -6 | 0.33% | 0.37% | 0.43% | 0.01% |
| -3 | 0.21% | 0.23% | 0.27% | 0.00% |
| 0 | 0.10% | 0.09% | 0.13% | 0.00% |

FIG. 12

RESOURCE ALLOCATION METHOD AND DEVICE FOR ENHANCING RECEPTION PERFORMANCE OF UPLINK CONTROL CHANNEL IN WIRELESS COMMUNICATION SYSTEM

CROSS-REFERENCE TO RELATED APPLICATION(S)

This application is a continuation application, claiming priority under § 365(c), of an International application No. PCT/KR2021/014646, filed on Oct. 20, 2021, which is based on and claims the benefit of a Korean patent application number 10-2020-0151570, filed on Nov. 13, 2020, in the Korean Intellectual Property Office, the disclosure of which is incorporated by reference herein in its entirety.

BACKGROUND

1. Field

The disclosure relates to a resource allocation method and device for enhancing reception performance of an uplink control channel in a wireless communication system.

2. Description of Related Art

An Effort is being made to develop an improved 5th generation (5G) communication system or a pre-5G communication system in order to meet the increasing demand for wireless data traffic after the commercialization of a 4th generation (4G) communication system. For this reason, the 5G communication system or the pre-5G communication system is called a communication system after the 4G network (Beyond 4G Network) or system after the long term evolution (LTE) system (Post LTE). In order to achieve a high data rate, the 5G communication system is being considered for implementation in a super high frequency (millimeter wave (mmWave)) band (e.g., such as a 60 giga (60 GHz) band). In order to alleviate the path loss of radio waves in the super high frequency band and increase the transmission distance of radio waves, in the 5G communication system, beamforming, massive multiple-input multiple-output (MIMO), Full Dimensional MIMO (FD-MIMO), array antenna, analog beam-forming, and large scale antenna technologies are being discussed. Also, in order to improve the network of the system, in the 5G communication system, technologies such as evolved small cell, advanced small cell, cloud radio access network (cloud RAN), ultra-dense network, Device to Device communication (D2D), wireless backhaul, moving network, cooperative communication, Coordinated Multi-Points (CoMP), interference cancellation, and the like are being developed. In addition, in 5G system, an Advanced Coding Modulation (ACM) method such as Hybrid frequency shift keying (FSK) and quadrature amplitude modulation (QAM) (FQAM) and Sliding Window Superposition Coding (SWSC), and an advanced connection technology such as Filter Bank Multi Carrier (FBMC), non orthogonal multiple access (NOMA), sparse code multiple access (SCMA), and the like are being developed.

Meanwhile, the Internet is evolving from a human-centered network in which humans generate and consume information to an Internet of Things (IoT) network that exchanges and processes information between distributed components such as an object, and the like. Internet of Everything (IoE) technology, which combines Big data processing technology, and the like through connection with a cloud server, and the like with IoT technology, is also emerging. In order to implement IoT, technology elements such as sensing technology, wired and wireless communication and network infrastructure, service interface technology, and security technology are important, and recently, a technology such as sensor network, Machine to Machine (M2M), and Machine Type Communication (MTC), and the like for connection between objects has been studied. In an IoT environment, an intelligent Internet Technology (IT) service that create a new value in human life by collecting and analyzing data generated from connected objects may be provided. IoT may be applied to field such as smart home, smart building, smart city, smart car or connected car, smart grid, health care, smart home appliance, and advanced medical service, and the like through convergence and combination between an existing information technology (IT) technology and a various industry.

Accordingly, various attempts are being made to apply the 5G communication system to the IoT network. For example, technologies such as sensor network, Machine to Machine (M2M), Machine Type Communication (MTC), and the like are being implemented by techniques such as beamforming, MIMO, array antenna, and the like, which are 5G communication technologies. The application of cloud radio access network (cloud RAN) as a big data processing technology described above may be an example of the convergence of 5G technology and IoT technology.

Meanwhile, a various study has been conducted on a transmission method of an uplink control channel for a terminal to request scheduling to a base station or to provide specific information in a wireless communication system, and in particular, a various discussion have been made about a method for efficiently transmitting Physical Uplink Control channel (PUCCH).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of improving the reception performance of a Physical Uplink Control Channel (PUCCH) in a wireless communication system, and in 5G (or new radio (NR)), various PUCCH formats are supported, and transmission of the PUCCH formats is possible on various number of symbols and transmission resources according to each PUCCH format. In particular, in the use of a limited wireless communication resource, a part of PUCCH formats support UE multiplexing to increase resource efficiency.

An aspect of the disclosure is to provide a method and device for improving reception performance of PUCCH transmitted from a plurality of users in the same resource block.

Additional aspects will be set forth in part in the description which follows and, in part, will be apparent from the description, or may be learned by practice of the presented embodiments.

In accordance with an aspect of the disclosure, a method executed by a base station in a wireless communication system is provided. The method includes receiving, from a terminal, a signal for determining environment information of the terminal, identifying the environment information of the terminal based on the signal, identifying resource allocation information for a physical uplink control channel (PUCCH) format 1 signal based on the environmental information of the terminal, transmitting the resource allocation information to the terminal, and receiving the PUCCH format 1 signal from the terminal based on the resource allocation information.

According to an embodiment of the disclosure, the environment information of the terminal may include at least one of timing alignment command information, movement speed of the terminal, time offset information between the base station and the terminal, or frequency offset information between the base station and the terminal.

According to an embodiment of the disclosure, the resource allocation information may include orthogonal sequence (OS) information and cyclic shift (CS) information.

According to an embodiment of the disclosure, the OS information and the CS information may be determined based on the time offset information and the frequency offset information.

According to an embodiment of the disclosure, the orthogonal sequence (OS) information and the CS information may be determined based on the number of terminals allocated a resource for the PUCCH format 1 signal in a resource block for the PUCCH format 1 signal and a length of the OS.

In accordance with aspect of the disclosure, a method executed by a terminal in a wireless communication system is provided. The method includes transmitting a signal for determining environment information of a terminal to a base station, receiving resource allocation information for a physical uplink control channel (PUCCH) format 1 signal from the base station, and transmitting the PUCCH format 1 signal to the base station based on the resource allocation information, and wherein the resource allocation information may be determined based on environmental information of the terminal, and wherein the environment information of the terminal may be identified based on the signal.

In accordance with aspect of the disclosure, a base station in a wireless communication system is provided. The base station includes a transceiver for transmitting and receiving a signal, and a control unit connected to the transceiver, and wherein the control unit may be configured to receive, from a terminal, a signal for determining environment information of the terminal, identify environment information of the terminal based on the signal, identify resource allocation information for a physical uplink control channel (PUCCH) format 1 signal based on the environmental information of the terminal, transmit the resource allocation information to the terminal, and receive the PUCCH format 1 signal from the terminal based on the resource allocation information.

In accordance with aspect of the disclosure, a terminal in a wireless communication system is provided. The terminal includes a transceiver for transmitting and receiving a signal, and a control unit connected to the transceiver, and wherein the control unit may be configured to transmit, a signal for determining environment information of a terminal to a base station, receive, resource allocation information for a physical uplink control channel (PUCCH) format 1 signal from the base station, and transmit, the PUCCH format 1 signal to the base station based on the resource allocation information, and wherein the resource allocation information may be determined based on environmental information of the terminal, and wherein the environment information of the terminal may be identified based on the signal.

According to the disclosure, regarding a PUCCH resource, by reducing interference generated in a plurality of terminal according to a situation based on a communication environment, it is possible to improve PUCCH reception performance and increase Downlink throughput and cell coverage.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5, 6, 7, and 8 are diagrams illustrating a resource allocation table for an OS and a CS according to various embodiments of the disclosure;

FIGS. 9, 10, 11, and 12 are diagrams illustrating a result of simulating communication between a base station and a plurality of terminals to identify an effect according to various embodiments of the disclosure;

Throughout the drawings, it should be noted that like reference numbers are used to depict the same or similar elements, features, and structures.

DETAILED DESCRIPTION

Figure 1:
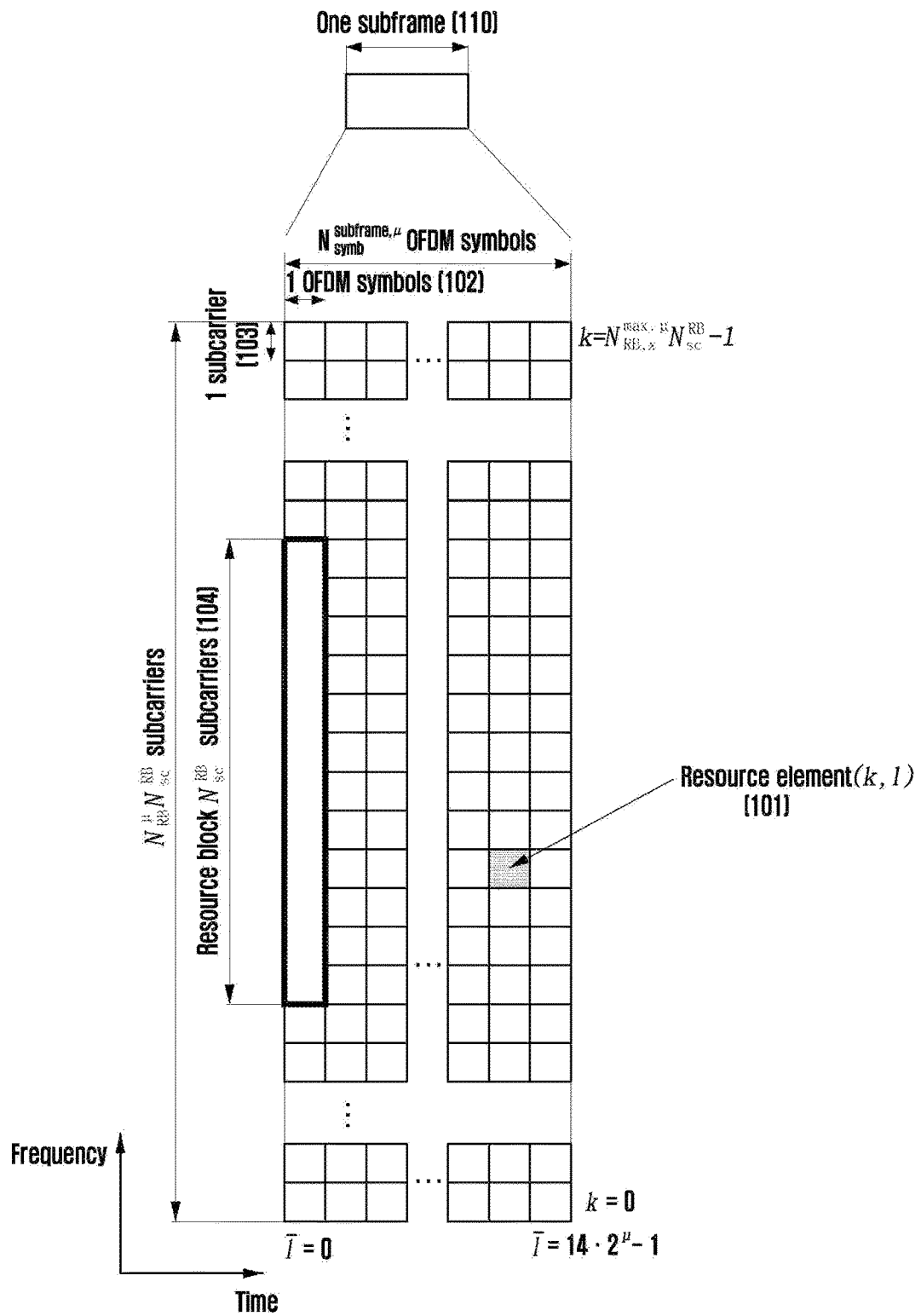
FIG. 1 is a diagram illustrating a basic structure of a time-frequency domain that is a wireless resource domain in which data or a control channel is transmitted in a 5G system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An advantage and a feature of the disclosure and a method for achieving them will become clear with reference to the embodiments described below in detail together with the accompanying drawing. However, the disclosure is not limited to the embodiments disclosed below, but may be implemented in different various forms, and only the embodiments are provided to make the disclosure of the disclosure complete, and to completely inform the scope of the disclosure to those skilled in the art to which the disclosure belongs, and the disclosure is only defined by the scope of the claim. Throughout the specification, the same reference numeral refers to the same component.

In this case, it will be able to be understood that each block of processing flow chart drawings and combinations of flow chart drawings may be performed by computer program instructions. Since these computer program instructions may be mounted on a processor of a general-purpose computer, a special-purpose computer, or other programmable data processing equipment, the instructions executed through the processor of the computer or the other programmable data processing equipment may execute the functions described in the flow chart block(s). Since these computer program instructions may also be stored in computer-usable or computer-readable memory that may be oriented toward the computer or the other programmable data processing equipment to implement the function in a particular way, the instructions stored in the computer-usable or computer-readable memory may also produce a manufacturing item containing the instruction that executes the function described in the flow chart block(s). Since the computer program instructions may also be mounted on the computer or the other programmable data processing equipment, instructions in which a series of operations are executed on the computer or the other programmable data processing equipment and creates a computer-executed process and executes the computer or the other programmable data processing equipment, may also provide operations for executing the functions described in the flow chart block(s).

Also, each block may represent a module, segment, or a part of code including one or more executable instructions for executing a specific logical function(s). In addition, it should also be noted that in some alternative implementations, it may be possible for the functions mentioned in the blocks to occur out of order. For example, two blocks illustrated in succession may actually substantially be executed at the same time, or the blocks may sometimes be executed in reverse order according to the corresponding function.

In this case, the term '~unit' used in an embodiment of the disclosure denotes a software or a hardware component such as field-programmable gate array (FPGA) or application-specific standard product (ASIC), and the '~unit' may perform certain roles. However, '~unit' may not mean limited to the software or the hardware. The '~unit' may be configured to be in an addressable storage medium and may be configured to play one or more processors. Thus, as an example, the '~unit' includes components such as software components, object-oriented software components, class components, and task components, processes, functions, attributes, procedures, subroutines, program code segments, drivers, firmware, microcode, circuit, data, database, data structures, tables, arrays, and variables. The functions provided within the components and the '~unit' may be combined into the smaller numbers of components and the '~units' or may further be separated into the additional components and the '~units'. In addition, the components and the '~units' may be implemented to play one or more central processing units (CPUs) in a device or a secure multimedia card.

Hereinafter, embodiments of the disclosure will be described in detail with accompanying drawings. Also, in describing the disclosure, in case that it is determined that a detailed description of a related known function or configuration may unnecessarily obscure the gist of the disclosure, the detailed description thereof will be omitted. In addition, terms to be described later are terms defined in consideration of functions in the disclosure, which may vary depending on an intention or a custom, and the like of a user or an operator. Therefore, the definition should be based on the content throughout this specification.

Also, in describing the embodiments of the disclosure in detail, a wireless communication system based on orthogonal frequency-division multiplexing (OFDM), in particular, a 3rd Generation Partnership Project (3GPP) evolved universal terrestrial radio access (EUTRA) standard will be a main target, but the main gist of the disclosure may be applied to other communication systems having a similar technical background and a channel type with slight modifications within a range that does not greatly deviate from the scope of the disclosure, and this will be possible with the judgment of a person with skilled technical knowledge in the technical field of the disclosure.

The wireless communication system is evolving into a broadband wireless communication system that provides a high-speed and high-quality packet data service, such as a communication standard such as High Speed Packet Access (HSPA), Long Term Evolution (LTE) or Evolved Universal Terrestrial Radio Access (E-UTRA), and LTE-Advanced (LTE-A) of 3GPP, High Rate Packet Data (HRPD), Ultra Mobile Broadband (UMB), and 802.16e of Institute of Electrical and Electronics Engineers (IEEE) of 3GPP2, and the like, for example, beyond voice-oriented services in the early days. Also, as a 5G wireless communication system, a communication standard of 5G or new radio (NR) is being created.

As a representative example of the broadband wireless communication system, in the LTE/LTE-A system, an Orthogonal Frequency Division Multiplexing (OFDM) method is adopted in Downlink (DL), and a Single Carrier Frequency Division Multiple Access (SC-FDMA) method is adopted in Uplink (UL). The Uplink denotes a wireless link in which a terminal (User Equipment (UE) or a Mobile Station (MS)) transmits data or a control signal to a base station (eNode B, or base station (BS)), and the Downlink denotes a wireless link in which the base station transmits the data or the control signal to the terminal. The multiple access method as described above usually distinguishes data or control information of each user, by allocating and operating a time-frequency resource for carrying the data or the control information for each user so that they do not overlap each other, in other words, so that orthogonality is established.

FIG. 1 is a diagram illustrating a basic structure of a time-frequency domain that is a wireless resource domain in which data or a control channel is transmitted in a 5G system according to an embodiment of the disclosure.

Referring to FIG. 1, a horizontal axis represents a time domain and a vertical axis represents a frequency domain in FIG. 1. A basic unit of resources in the time and frequency domain is a resource element (RE) 101, which may be defined as 1 Orthogonal Frequency Division Multiplexing (OFDM) symbol 102 on a time axis and 1 Subcarrier 103 on a frequency axis. In the frequency domain, N_sc^RB (e.g., 12) consecutive REs may configure one resource block (RB) 104. One subframe 110 comprises $N_{symb}^{subframe, \mu}$ OFDM symbols.

Figure 2:
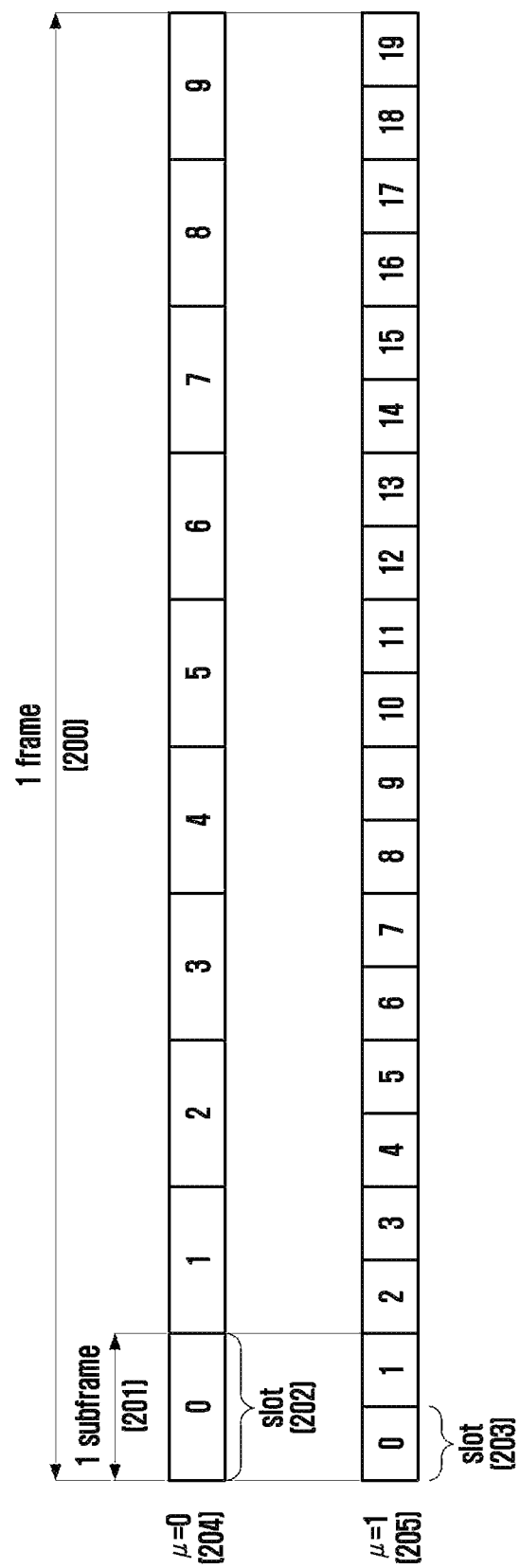
FIG. 2 is a diagram illustrating a structure of a frame, a subframe, and a slot that are time-axis resources in a 5G system according to an embodiment of the disclosure.

FIG. 2 is a diagram illustrating a structure of a frame, a subframe, and a slot that are time-axis resources in a 5G system according to an embodiment of the disclosure.

Referring to FIG. 2, an example of a structure of a Frame 200, a Subframe 201, and a Slot 202 are illustrated in FIG. 2. The 1 Frame 200 may be defined as 10 ms. The 1 Subframe 201 may be defined as 1 ms, and thus, the 1 Frame 200 may be configured with a total of the 10 Subframes 201. The 1 Slots 202 and 203 may be defined as 14 OFDM symbols (i.e., the number of the symbol per the 1 Slot ($N_{symb}^{slot}$)=14). The 1 Subframe 201 may be configured with one or more Slots 202 and 203, and the number of the Slots 202 and 203 per the 1 Subframe 201 may vary depending on set values μ 204 and 205 for subcarrier spacing (SCS). In an example of FIG. 2, a case in which μ=0 204 and a case in which μ=1 (205) are illustrated as a subcarrier interval setting value. In case that the μ=0 204, the 1 Subframe 201 may be configured with 1 Slot 202, and in case that the μ=1 205, the 1 Subframe 201 may be configured with 2 slots 203. In other words, the number of the slot ($N_{slot}^{subframe, \mu}$) per the 1 subframe may vary depending on the set value μ for the subcarrier interval, and accordingly, the number of the slot ($N_{slot}^{frame, \mu}$) per the 1 frame may vary. The $N_{slot}^{subframe, \mu}$ and the $N_{slot}^{frame, \mu}$ according to each subcarrier interval setting μ may be defined as shown in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Meanwhile, in 5G, one transmission time interval (TTI) may be defined as one slot. Also, in the 5G, for emergency transmission and transmission in an unlicensed band, the one TTI may be defined as one mini-slot or sub-slot, and the one mini-slot may have the number of the OFDM symbol from 1 to N (the total number of the OFDM symbol of the slot)−1. For example, in case that the length of the one slot is 14 OFDM symbols, the length of the mini-slot may be determined among 1 to 13 OFDM symbols. The length, format, and repetition form of the slot or the mini-slot are defined in the standard or transmitted by a higher layer signal, system information, or a physical signal so that the terminal may receive them. Also, instead of the mini-slot or the sub-slot, the slot may be determined among 1 to 14 OFDM symbols, and the length of the slot may be transmitted by the higher layer signal or the system information so that the terminal may receive it.

The slot or the mini-slot may be defined to have a various transmission format and may be classified into the following formats.

DL only slot or full DL slot: DL only slot or full DL slot is configured with only a DL section, and only DL transmission is supported.

DL centric slot: DL centric slot is configured with the DL section, a GP (or a flexible symbol), and a UL section, and the number of the OFDM symbol in the DL section is greater than the number of the OFDM symbol in the UL section.

UL centric slot: UL centric slot is configured with the DL section, the GP (or the flexible symbol), and the UL section, and the number of the OFDM symbol in the DL section is less than the number of the OFDM symbol in the UL section.

UL only slot or full UL slot: UL only slot or full UL slot is configured with only the UL section, and only UL transmission is supported.

Although only the slot format have been classified in the above, the mini-slots may also be classified in the same classification method. In other words, it may be classified into a DL only mini-slot or full DL mini-slot, a DL centric mini-slot, an UL centric mini-slot, and an UL only mini-slot or full UL mini-slot. In the above, the flexible symbol may be used as a guard symbol for transmission/reception switching, and may also be used for the purpose of channel estimation.

Figure 3:
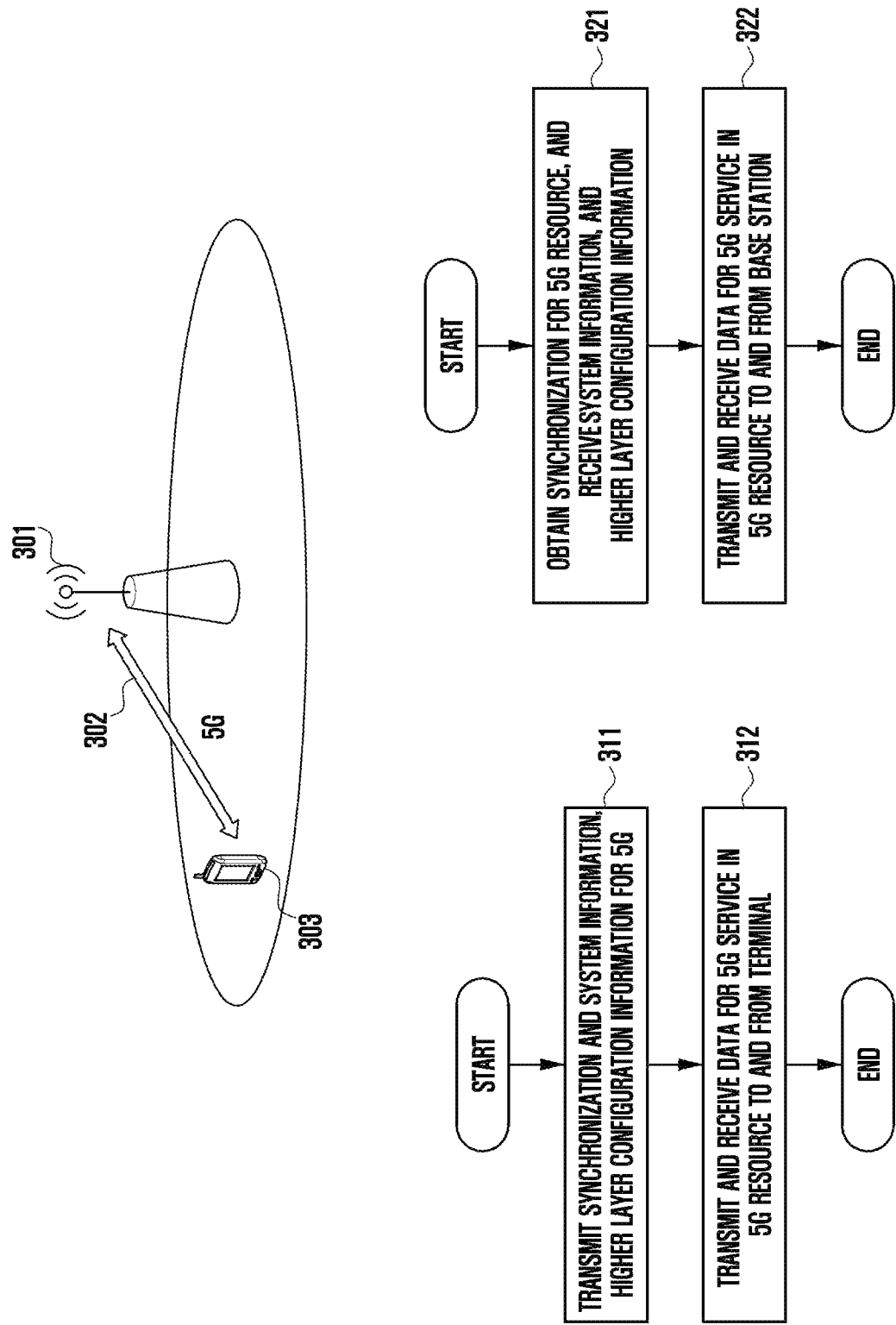
FIG. 3 is a diagram illustrating a communication system according to an embodiment of the disclosure.

FIG. 3 is a diagram illustrating a communication system according to an embodiment of the disclosure.

Referring to FIG. 3, FIG. 3 illustrates a case in which a 5G cell 302 is operated in one base station 301 in a network. The terminal 303 is a 5G capable terminal having a 5G transmission/reception module. The terminal 303 obtains synchronization through a synchronization signal transmitted from the 5G cell 302, receives system information, and then transmits and receives data through the base station 301 and the 5G cell 302. In this case, there is no limitation on a duplex method of the 5G cell 302. Uplink control transmission is transmitted through the 5G cell 302 in case that the 5G cell is a P cell. In the system of FIG. 3, the 5G cell may include a plurality of serving cells, and may support 32 serving cells in total. In the network, it is assumed that the base station 301 includes the 5G transmission/reception module (system), and the base station 301 may manage and operate the 5G system in real time.

Next, a procedure for the base station 301 to set a 5G resource and to transmit/receive data with the 5G capable terminal 303 on the resource for 5G will be described.

In operation 311, the base station 301 transmits synchronization, system information, and higher layer configuration information for 5G to the 5G capable terminal 303. As for the synchronization signal for 5G, separate synchronization signals may be transmitted for different services using different numerologies, and a common synchronization signal may be transmitted to specific 5G resources using one numerology. For the system information, a common system signal may be transmitted to the specific 5G resource using the one numerology, and separate system information may be transmitted for other services using the different numerologies. The system information and the higher layer configuration information may include configuration information on whether to transmit/receive data in slots or minislots, and may include the number of the OFDM symbol and the numerology of the slot or the mini-slot. Also, the system information and the higher layer configuration information may include configuration information related to the reception of the DL common control channel in case that the reception of the DL common control channel is configured to the terminal. Also, the system information and the higher layer configuration information include a PUCCH transmission resource necessary for transmission of the physical uplink control channel (PUCCH) (or PUCCH format) to the terminal, and necessary resources for selecting and transmitting each PUCCH format will be described in detail later.

In operation 312, the base station 301 transmits and receives data for the 5G service to and from the 5G capable terminal 303 in the 5G resource, and in particular, receives information on whether to receive the DL data from the terminal through the PUCCH format.

Next, a procedure for the 5G capable terminal 303 to get a configuration of the 5G resource from the base station 301 and to transmit/receive data using the 5G resources will be described.

In operation 321, the 5G capable terminal 303 obtains synchronization from the synchronization signal for 5G transmitted by the base station 301, and receives system information and the higher layer configuration information transmitted by the base station 301. As for the synchronization signal for 5G, the separate synchronization signal may be transmitted for different services using the different numerologies, and the common synchronization signal may be transmitted to the specific 5G resource using one numerology. For the system information, the common system signal may be transmitted to the specific 5G resource using one numerology, and the separate system information may be transmitted for other services using the different numerologies. Also, the system information and the higher layer configuration information may include configuration information related to the reception of the DL common control channel in case that the reception of the DL common control channel is configured to the terminal. Also, the system information and the higher layer configuration information include the PUCCH transmission resource necessary for transmission of the physical uplink control channel (PUCCH) (or PUCCH format) to the terminal, and necessary resources for selecting and transmitting each PUCCH format will be described in detail later.

In operation 322, the 5G capable terminal 303 transmits and receives data for the 5G service to and from the base station 301 in the 5G resource. In particular, it transmit information on whether to receive the DL data to the base station through the PUCCH format.

Hereinafter, the PUCCH will be described in detail.

The physical uplink control channel (PUCCH) is a physical channel made for transmitting user control information such as Channel State Information (CSI), Scheduling Request (SR), hybrid automatic repeat request (HARQ)-acknowledgment (ACK)/negative acknowledgement (NACK), and the like.

NR PUCCH is defined as a total of 5 formats (formats 0 to 4) to secure the size of information and Coverage being transmitted. It may be classified into a Short PUCCH and a Long PUCCH according to the length (the number of the symbol) of the PUCCH format, the short PUCCH has 1 to 2 symbols and corresponds to PUCCH format 0/2, and the Long PUCCH has 4 to 14 symbols and corresponds to PUCCH format 1/3/4.

A brief summary of the NR PUCCH format is shown in Table 2 below.

TABLE 2

|  | Format 0 | Format 1 | Format 2 | Format 3 | Format 4 |
| --- | --- | --- | --- | --- | --- |
| Waveform | CP-OFDM | DFT-s-OFDM | CP-OFDM | DFT-s-OFDM | DFT-s-OFDM |
| # of symbols | 1-2 | 4-14 | 1-2 | 4-14 | 4-14 |
| # of RBs | 1 | 1 | 1-16 | 1-6, 8-10, 12, 15, 16 | 1 |
| # of UCI bits | ≤2 | | | ≥3 | |
| UCI types | 1-bit/2-bit HARQ-ACK and/or SR | | HARQ-ACK w/w.o. SR and/or CSI feedback | | |
| UE multiplexing | Cyclic Shift | Time domain OCC | N/A | N/A | pre-DFT-OCC {2, 4} |

Figure 4:
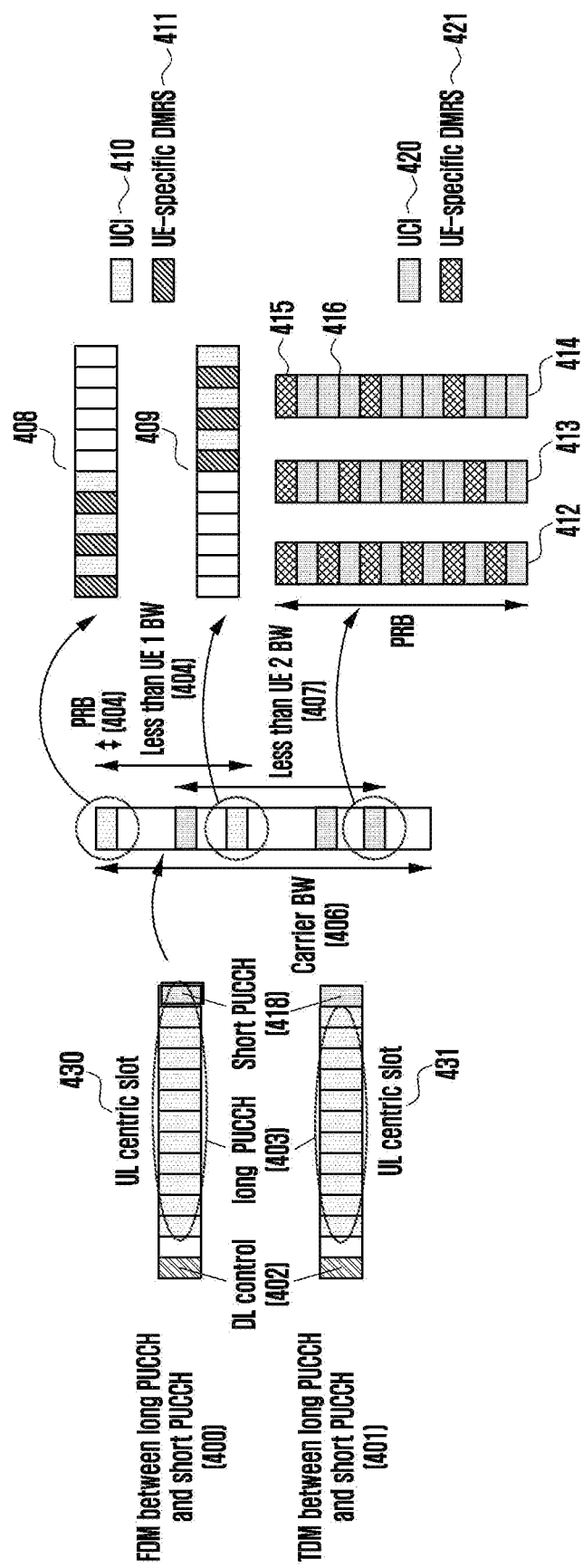
FIG. 4 is a diagram illustrating a structure of an uplink control channel in according to an embodiment of the disclosure.

FIG. 4 is a diagram illustrating a structure of a physical uplink control channel (PUCCH) according to an embodiment of the disclosure.

Referring to FIG. 4, a method in which a terminal determines a transmission section (or a start symbol and an end symbol) of a long PUCCH based on a slot and transmits the physical uplink control channel (PUCCH) will be described, but it goes without saying that it may be applied to a case in which the terminal determines the transmission section (or the start symbol and the end symbol) of the long PUCCH based on a mini-slot and transmits the physical uplink control channel (PUCCH).

In FIG. 4, it is illustrated that the long PUCCH and the short PUCCH are multiplexed in a frequency domain (FDM) 400, or multiplexed in a time domain (TDM) 401. First, in FIG. 4, a slot structure in which the long PUCCH and the short PUCCH are multiplexed will be described. 430 and 431 show, in other words, UL centric slot in which uplink is mainly used in the slot (Several names such as a subframe or a transmission time interval (TTI), and the like may be used. In the disclosure, the basic transmission unit is referred to as a slot), which is the basic transmission unit of 5G. In the UL centric slot, most of the OFDM symbols are used for uplink and a case where all OFDM symbols are used for uplink transmission is also possible, or it is also possible that several OFDM symbols at the front are used for downlink transmission, and in case that downlink and uplink simultaneously exist in one slot, a transmission gap may exist between the two slots. In FIG. 4, a first OFDM symbol in the one slot is used for downlink transmission, for example, downlink control channel transmission 402, and is used for the uplink transmission from a third OFDM symbol. A second OFDM symbol is used as the transmission gap. In the uplink transmission, uplink data channel transmission and uplink control channel transmission are possible.

Next, a long PUCCH 403 will be described. Since a control channel with a long transmission period is used for the purpose of increasing cell coverage, it may be transmitted in a direct fourier transform (DFT)-spread (S)-OFDM method, which is a single carrier transmission, rather than OFDM transmission. Accordingly, in this case, it must be transmitted using only consecutive subcarriers, and it may set frequency hopping to be able to obtain a frequency diversity effect. In other words, in case that the frequency hopping is applied (in case that the frequency hopping is allowed with a higher layer signal), an uplink control channel with a long transmission section may be configured at a location away from each other such as 408 and 409. In case that the frequency hopping is not applied (in case that frequency hopping is disabled with the higher layer signal), it may be transmitted during a transmission symbol section of the long PUCCH at a frequency location of 408 (i.e., a frequency location by transmission start physical resource block (PRB) information and information on the number of PRB set at the higher layer signal). In terms of frequency, the distance 405 away from each other must be smaller than the bandwidth supported by the terminal, in the front part of the slot, it is transmitted by using PRB-1 as in 408, and in the rear part of the slot, it is transmitted by using PRB-2 as in 409. In the above, the PRB is a physical resource block, which denotes a minimum transmission unit on the frequency side, and may be defined as 12 subcarriers and the like. Therefore, a distances in a frequency axis between PRB-1 and PRB-2 must be smaller than the maximum supported bandwidth of the terminal, and the maximum supported bandwidth of the terminal may be equal to or smaller than the bandwidth 406 supported by the system. Also, the control channel transmitted in the front part of the slot 408 and the control channel transmitted in the rear part of the slot 409 are configured with the uplink control information (UCI) of 410 and the terminal reference signal (e.g., DMRS 411), respectively, and it is assumed that the two signals are separated in time and transmitted from different OFDM symbols.

The Long PUCCH supports transmission formats such as PUCCH format 1, PUCCH format 3, and PUCCH format 4 depending on the number of supportable control information bits and whether terminal multiplexing is supported through Pre-DFT OCC support at the front end of inverse fast fourier transform (IFFT).

First, the PUCCH format 1 is a DFT-S-OFDM-based long PUCCH format capable of supporting control information of up to 2 bits. The control information may be configured with a combination or each of an HARQ-ACK and a Scheduling Request (SR). The PUCCH format 1 is repeatedly configured with an OFDM symbol including a DeModulation Reference signal (DMRS), which is a demodulation reference signal (or reference signal), and an OFDM symbol including Uplink Control Information (UCI). For example, in case that the number of transmission symbols of the PUCCH format 1 is 8 symbols, it configured with DMRS symbol, UCI symbol, DMRS symbol, UCI symbol, DMRS symbol, UCI symbol, DMRS symbol, and UCI symbol in order from the first start symbol of the 8 symbols. The DMRS symbol has a structure in which a sequence corresponding to a length of 1 RB on a frequency axis within one OFDM symbol is spread by using an orthogonal code (Orthogonal Sequence, OS, or orthogonal sequence or spreading code, w_i(m)) on a time axis, and transmitted after performing IFFT. The UCI symbol has a structure in which d(0) is generated by modulation with binary phase shift keying (BPSK) in case of 1-bit control information or with quadrature phase shift keying (QPSK) in case of 2-bit control information, the generated d(0) is multiplied by a sequence corresponding to the length of 1 RB on the frequency axis and scrambling is performed, and the scrambled sequence is spread by using the orthogonal code (or the orthogonal sequence or the spreading code, the w_i(m)) on the time axis and transmitted after performing IFFT. The terminal generates a sequence based on the group hopping or sequence hopping configuration which are configured by the higher layer signal from the base station and the configured identifier (ID), and generates the sequence corresponding to the length of 1 RB by cyclic shifting the generated sequence with an initial cyclic shift (CS) value configured by the higher layer signal.

The length ($N_{SF,m'}^{PUCCH,1}$ or $N_{SF}$) of the OS or the spreading code may be determined according to the number of symbols of the PUCCH format 1 and whether the frequency hopping within the slot is configured, and may be given as shown in Table 3 below. As shown in Table 3, since the number of symbols of the PUCCH format 1 is given as 4 to 14, and the number of UCI symbols in one slot is disposed to intersect with DMRS symbols, $N_{SF}$ for this may be given as a value between 1 and 7.

TABLE 3

| | $N_{SF,m'}^{PUCCH,1}$ | | |
| --- | --- | --- | --- |
| PUCCH length, | No intra-slot hopping | Intra-slot hopping | |
| $N_{symb}^{PUCCH,1}$ | m' = 0 | m' = 0 | m' = 1 |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

The w_i(m) is given as shown in Table 4 below according to the length ($N_{SF}$) of the spreading code. i means the index of the spreading code itself, and m means the index of elements of the spreading code. Here, the numbers in [ ] in Table 4 mean φ(m), for example, in case that the length of the spreading code is 2 and the index i=0 of the set spreading code, the spreading code w_i(m) becomes $w_i(0) = e^{j2\pi \cdot 0/N_{SF}} = 1$, $w_i(1) = e^{j2\pi \cdot 0/N_{SF}} = 1$ and then becomes w_i(m)=[1 1].

TABLE 4

The spreading code (orthogonal sequences) for the PUCCH format 1
$w_i(m) = e^{j2\pi\varphi(m)/N_{SF}}$

| $N_{SF}$ | i = 0 | i = 1 | i = 2 | i = 3 | i = 4 | i = 5 | i = 6 |
|---|---|---|---|---|---|---|---|
| | | | $\varphi(m)$ | | | | |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, the PUCCH format 3 is a DFT-S-OFDM-based long PUCCH format capable of supporting control information of more than 2 bits. The control information may be configured with a combination or each of HARQ-ACK, Channel State Information (CSI), and SR. The DMRS symbol location in the PUCCH format 3 is presented in Table 5 below depending on whether frequency hopping is performed and whether additional DMRS symbols are configured.

TABLE 5

DMRS location within PUCCH format ¾ transmission

| PUCCH format ¾ transmission length | Additional DMRS not configured | | Additional DMRS is configured | |
|---|---|---|---|---|
| | Frequency hopping not configured | Frequency hopping is configured | Frequency hopping not configured | Frequency hopping is configured |
| 4 | 1 | 0, 2 | 1 | 0, 2 |
| 5 | 0, 3 | 0, 3 | 0, 3 | 0, 3 |
| 6 | 1, 4 | 1, 4 | 1, 4 | 1, 4 |
| 7 | 1, 4 | 1, 4 | 1, 4 | 1, 4 |
| 8 | 1, 5 | 1, 5 | 1, 5 | 1, 5 |
| 9 | 1, 6 | 1, 6 | 1, 6 | 1, 6 |
| 10 | 2, 7 | 2, 7 | 1, 3, 6, 8 | 1, 3, 6, 8 |
| 11 | 2, 7 | 2, 7 | 1, 3, 6, 9 | 1, 3, 6, 9 |
| 12 | 2, 8 | 2, 8 | 1, 4, 7, 10 | 1, 4, 7, 10 |
| 13 | 2, 9 | 2, 9 | 1, 4, 7, 11 | 1, 4, 7, 11 |
| 14 | 3, 10 | 3, 10 | 1, 5, 8, 12 | 1, 5, 8, 12 |

For example, in case that the number of transmission symbols of PUCCH format 3 is 8 symbols, the first start symbol of the 8 symbols starts with 0, and the DMRS is transmitted on the 1st symbol and the 5th symbol. The table is applied to the DMRS symbol location of the PUCCH format 4 in the same manner.

Next, the PUCCH format 4 is the DFT-S-OFDM-based long PUCCH format capable of supporting the control information of more than 2 bits. The control information may be configured with the combination or each of the HARQ-ACK, the Channel State Information (CSI), and the SR. The difference between the PUCCH format 4 and the PUCCH format 3 is that in case of the PUCCH format 4, PUCCH format 4 of several terminals may be multiplexed within one RB. It is possible to multiplex the PUCCH format 4 of a plurality of terminals by applying Pre-DFT OCC to control information at the front end of the IFFT. However, the number of transmittable control information symbols of one terminal is reduced according to the number of multiplexed terminals.

Next, a short PUCCH 418 will be described. The short PUCCH may be transmitted in both the downlink-centered slot and the uplink-centered slot, and is generally transmitted in the last symbol of the slot or the OFDM symbol at the end. The short PUCCH may be transmitted from both the downlink-centered slot and the uplink-centered slot, and is generally transmitted from the last symbol of the slot or the OFDM symbol (e.g., the last OFDM symbol or the second OFDM symbol from the end, or the last 2 OFDM symbol) in the rear part of the slot. Of course, it is also possible that Short PUCCH is transmitted from an arbitrary location within a slot. In addition, the Short PUCCH may be transmitted by using one OFDM symbol or two OFDM symbols. In FIG. 4, the Short PUCCH is transmitted from the last symbol (e.g., short PUCCH 418) of the slot. A wireless resource for the Short PUCCH are allocated in units of PRB on the frequency side, and as for the allocated PRBs, one PRB or a plurality of consecutive PRB 404 may be allocated, and a plurality of PRBs away from frequency bands may be allocated. In addition, the allocated PRB should be included in a band equal to or smaller than the frequency band 407 supported by the terminal. In addition, the uplink control information 420 and the demodulation reference signal 421 should be multiplexed in the frequency band within one PRB, and a method of transmitting a demodulation reference signal to one subcarrier per every two symbols as in 412, or a method of transmitting a demodulation reference signal to one subcarrier per every three symbols as in 413, or a method of transmitting a demodulation reference signal to one subcarrier in the middle per every three symbols as in 414, and the like may exist. In the demodulation signal transmission method such as 412, 413, and 414, which method to use may be configured by the higher layer signal. For example, the symbol 415 conveys UE-specific DMRS and the symbol 416 conveys UCI. Alternatively, one of the mapping methods is defined in the standard, and the terminal transmits the short PUCCH according to the mapping method, and the base station demodulates the short PUCCH according to the mapping method. Alternatively, the terminal multiplexes and transmits the demodulation reference signal and uplink control information as a method indicated through reception of the higher layer signal. Alternatively, the method of transmitting the demodulation reference signal may be determined according to the number of bits of the uplink control information 420. For example, in case that the number of bits of the uplink control information is small, the terminal may transmit through multiplexing of the demodulation reference signal such as 412 and the uplink control information. In case that the number of bits of the uplink control information is small, a sufficient transmission code rate may be obtained without using many resources for transmission of the uplink control information. For example, in case that the number of bits of the uplink control information is large, the terminal may transmit through multiplexing of the demodulation reference signal such as 415 and the uplink control information such as 416. In case that the number of bits of the uplink control information is large, it is necessary to use many resources for transmission of the uplink control information to lower the transmission code rate.

The short PUCCH supports the transmission formats such as the PUCCH format 0 and PUCCH format 2 depending on the number of supportable control information bits. First, the PUCCH format 0 is a CP-OFDM-based short PUCCH format capable of supporting control information of up to 2 bits. The control information may be configured with the combination or each of the HARQ-ACK and the SR. The PUCCH format 0 has a structure in which does not transmit DMRS and only sequences mapped to 12 subcarriers in a frequency axis are transmitted within one OFDM symbol. The PUCCH format 0 has a structure in which does not transmit DMRS and only transmits sequences mapped to 12 subcarriers to a frequency axis within one OFDM symbol. The terminal generates a sequence based on the configuration of group hopping or sequence hopping configuration configured by the higher layer signal from the base station and the configured ID, and the generated sequence is cyclically shifted to a final CS value obtained by adding different CS value depending on whether it is ACK or NACK to the indicated initial cyclic shift (CS) value, and mapped to 12 subcarriers and transmitted.

For example, in case that the HARQ-ACK is 1 bit, as shown in Table 6 below, if it is ACK, 6 is added to the initial CS value to generate the final CS, and if it is NACK, 0 is added to the initial CS to generate the final CS. The CS value 0 for NACK and the CS value 6 for ACK are defined in the standard, and the terminal always generates the PUCCH format 0 according to the values and transmits 1-bit HARQ-ACK.

TABLE 6

| 1-bit HARQ-ACK | NACK | ACK |
| --- | --- | --- |
| Final CS | (Initial CS + 0) mod 12 = Initial CS | (Initial CS + 6) mod 12 |

For example, in case that the HARQ-ACK is 2 bits, as shown in Table 7 below, if (NACK, NACK), add 0 to the initial CS value, if (NACK, ACK), add 3 to the initial CS value, if (ACK, ACK), add 6 to the initial CS value, if (ACK, NACK), add 9 to the initial CS value. The CS value 0 for (NACK, NACK), the CS value 3 for (NACK, ACK), the CS value 6 for (ACK, ACK), and the CS value 9 for (ACK, NACK) are defined in the standard, and the terminal always generates the PUCCH format 0 according to the value and transmits the 2-bit HARQ-ACK.

In the above, in case that the final CS value exceeds 12 by the CS value added according to the ACK or NACK to the initial CS value, it is possible to apply modulo 12 because the length of the sequence is 12.

TABLE 7

| 2-bit HARQ-ACK | NACK, NACK | NACK, ACK | ACK, ACK | ACK, NACK |
| --- | --- | --- | --- | --- |
| Final CS | (Initial CS + 0) mod 12 = Initial CS | (Initial CS + 3) mod 12 | (Initial CS + 6) mod 12 | (Initial CS + 9) mod 12 |

Next, the PUCCH format 2 is a CP-OFDM-based short PUCCH format capable of supporting control information of more than 2 bits. The control information may be configured with a combination or each of the HARQ-ACK, the CSI, and the SR. The PUCCH format 2 is fixed to a subcarrier having indexes of #1, #4, #7, and #10 when the location of the subcarrier to which DMRS is transmitted within one OFDM symbol refers to the index of the first subcarrier as #0, as shown in FIG. 4. The control information is mapped to the remaining subcarriers except for the subcarrier in which the DMRS is located through a modulation process after channel encoding.

The terminal receives a configuration of the PUCCH resource through the higher layer signal. The terminal selects the configured PUCCH resource sets, according to the number of control information bits. In a specific slot, the terminal selects PUCCH resource set 0 when the number of control information bits to be transmitted is 1 to 2, selects PUCCH resource set 1 when the number of control information bits to be transmitted is 3 to $N_2-1$, selects PUCCH resource set 2 when the number of control information bits to be transmitted is $N_2$ to $N_3-1$, and selects PUCCH resource set 3 when the number of control information bits to be transmitted is $N_3$ to $N_4-1$. The N2, N3, and N4 are all higher layer signals, and the terminal may receive them from the base station in advance. Each PUCCH resource set includes X PUCCH resources, and the X PUCCH resources include a resource for the short PUCCH (the PUCCH format 0, the PUCCH format 2) or a resource for the long PUCCH (the PUCCH format 1, the PUCCH format 3, the PUCCH format 4). In other words, each set PUCCH resource includes all information necessary to transmit a specific PUCCH format (the PUCCH format 0 or the PUCCH format 1 or the PUCCH format 2 or the PUCCH format 3 or the PUCCH format 4), and each PUCCH resource may be configured to transmit a different PUCCH format each other. The X is a constant, and X may be configured by the higher layer signal differently for each PUCCH resource set. In other words, the PUCCH resource set 0 may be X=32, and the remaining PUCCH resource sets 1, 2, and 3 may be X=8. Which resource among the X resources the terminal selects and transmits the PUCCH format corresponding to the selected resource may be indicated through a bit of a physical downlink control channel (PDCCH), may be induced through a transmission resource of the physical downlink control channel (PDCCH), a slot index, a unique identifier (ID) of the terminal, and the like. Alternatively, the indication and the method of inducing through the transmission resource, the slot index, the unique identifier (ID) of the terminal, and the like of the physical downlink control channel (PDCCH) by the physical downlink control channel (PDCCH) may be mixed and indicated to the terminal. The terminal selects One PUCCH resource from X PUCCH resources by receiving or inducing the indication method of the terminal, and transmitting the control information through the corresponding PUCCH format. The PUCCH resource indication method may be applied only in case that it is possible for a terminal to determine a PUCCH resource through reception of a corresponding physical downlink control channel (PDCCH) before HARQ-ACK transmission, such as HARQ-ACK transmission, and in case that there is no reception of the corresponding physical downlink control channel (PDCCH) before CSI or SR, such as CSI or SR transmission, the PUCCH format and necessary PUCCH resources to be used by the terminal when transmitting CSI or SR are received from the base station in advance through the higher layer signal, and in the slot for CSI or SR transmission according to the period and offset configured by the higher layer signal from the base station, the terminal transmits CSI or SR by using the set PUCCH format in the set PUCCH resource.

Each PUCCH resource corresponding to the PUCCH format includes at least one of the following information:

PUCCH transmission start symbol, number of PUCCH transmission symbols.

The index indicating the start PRB, the number of transmission PRBs, whether frequency hopping is set, the frequency resource of the second hop when frequency hopping is indicated.

Initial CS value, index of time axis Orthogonal Cover Code (OCC), Pre-DFT Length of OCC, Index of Pre-DFT OCC.

The range of necessary information and value according to each PUCCH format may be summarized in Table 8 as follows. In the following Table 8, in case that the value does not need to be set or in case that the range of values is not needed because it is 1, it is marked as N.A.

format 1, the PUCCH format 3, or the PUCCH format 4 unless otherwise specified. Also, in case that not specifically specified in the disclosure, transmitting to PUCCH format X denotes that a specific PUCCH format corresponding to the PUCCH resource is transmitted by using the PUCCH resource obtained through the method of the disclosure, such as indicated or induced and the like from the base station.

Next, the multiplexing of the long PUCCH and the short PUCCH described above will be described. Within one slot, the long PUCCH and the short PUCCH of different terminals may be multiplexed (e.g., in FDM 400) in the frequency domain. In this case, the base station may set the short PUCCH and the long PUCCH frequency resources of different terminals so as not to overlap as in the PRB of FIG. 4. However, it is a waste of frequency to differently set transmission resources of the physical uplink control channel (PUCCH) of all terminals regardless of whether they are scheduled, and limited frequency resources are not appropriate considering that they should be used for uplink data channel transmission rather than the physical uplink control channel (PUCCH) transmission. Therefore, the frequency resources of the short PUCCH and the long PUCCH of different terminals may overlap, and the base station should operate so that scheduling and the transmission resources of different terminals do not collide in one slot. However, in case that it is unavoidable that the short PUCCH transmission resource and the long PUCCH transmission resource of different terminals collide in a specific slot, the base station needs a plan to prevent the long PUCCH transmission

TABLE 8

|  |  | PUCCH Format 0 | PUCCH Format 1 | PUCCH Format 2 | PUCCH Format 3 | PUCCH Format 4 |
| --- | --- | --- | --- | --- | --- | --- |
| Starting symbol | Configurability | √ | √ | √ | √ | √ |
|  | Value range | 0-13 | 0-10 | 0-13 | 0-10 | 0-10 |
| Number of symbols in a slot | Configurability | √ | √ | √ | √ | √ |
|  | Value range | 1, 2 | 4-14 | 1, 2 | 4-14 | 4-14 |
| Index for identifying starting PRB | Configurability | √ | √ | √ | √ | √ |
|  | Value range | 0-274 | 0-274 | 0-274 | 0-274 | 0-274 |
| Number of PRBs | Configurability | N.A. | N.A. | √ | √ | N.A. |
|  | Value range | N.A. (Default is 1) | N.A. (Default is 1) | 1-16 | 1-6, 8-10, 12, 15, 16 | N.A. (Default is 1) |
| Enabling a FH | Configurability | √ | √ | √ | √ | √ |
|  | Value range | On/Off (only for 2 symbol) | On/Off | On/Off (only for 2 symbol) | On/Off | On/Off |
| Freq.cy resource of $2^{nd}$ hop if FH is enabled | Configurability | √ | √ | √ | √ | √ |
|  | Value range | 0-274 | 0-274 | 0-274 | 0-274 | 0-274 |
| Index of initial cyclic shift | Configurability | √ | √ | N.A. | N.A. | N.A. |
|  | Value range | 0-11 | 0-11 | N.A. | 0-11 | 0-11 |
| Index of time-domain OCC | Configurability | N.A. | √ | N.A. | N.A. | N.A. |
|  | Value range | N.A. | 0-6 | N.A. | N.A. | N.A. |
| Length of Pre-DFT OCC | Configurability | N.A. | N.A. | N.A. | N.A. | √ |
|  | Value range | N.A. | N.A. | N.A. | N.A. | 2, 4 |
| Index of Pre-DFT OCC | Configurability | N.A. | N.A. | N.A. | N.A. | √ |
|  | Value range | N.A. | N.A. | N.A. | N.A. | 0, 1, 2, 3 |

In the disclosure, in case that it is referred to as the short PUCCH hereinafter, it refers to the PUCCH format 0 or the PUCCH format 2 unless otherwise specified, in case that it is referred to as the long PUCCH, it refers to the PUCCH resource from colliding with the short PUCCH transmission resource, and the terminal needs to adjust the long PUCCH transmission resource according to the indication of the base station. The transmission resources of the short PUCCH and the long PUCCH may be multiplexed (e.g., in TDM 401) in the time domain in one slot, by the above method.

Hereinafter, a method and device for improving PUCCH reception performance according to an embodiment of the disclosure will be described. As described above, when the terminal is configured to transmit the PUCCH in one slot, the base station may provide information on a parameter or resource configured to the terminal through the higher layer signal and/or a physical signal to determine a resource for transmitting the PUCCH. In particular, since some PUCCH formats support UE multiplexing for efficient use of resources, a method for preventing collision between resources that need to transmit the PUCCH of a plurality of terminals is important. An embodiment of the disclosure proposes a method of improving PUCCH reception performance through the configuration for preventing interference between PUCCH transmission resources for the PUCCH format 1 among them.

As described above, the PUCCH format 1 may allocate multiple users within 1 RB to increase RB/symbol resource efficiency. The base station sets the Cyclic Shift (CS) and the Orthogonal Sequence (OS) through the higher layer signal for each user, and each user may transmit a signal based on the resources allocated through the configuration.

Theoretically, signals between users using different OS and CS within the same RB have orthogonal characteristics, so there is no mutual interference. However, since time offset and frequency offset exist in an actual PUCCH reception situation, orthogonality is broken even between users using different OS and CS, and interference between users may occur. The time offset and the frequency offset have different ways of affecting interference between users, in case of time offset, the CS orthogonal to the frequency axis is made non-orthogonal, and in case of frequency offset, the OS with characteristics orthogonal to the time axis is made non-orthogonal.

This mutual interference is the main cause of degrading the PUCCH reception SINR, in particular, in case that the time offset and frequency offset are severe, the SINR is saturated and signal reception may not be possible due to mutual interference even though the signal is transmitted no matter how strong it is. Expressing this mathematically, it is as follows.

The i-th tone and k-th symbol transmission signal $S_{i,k,u}$ of the u-th UE may be expressed as the following Equation 1. Here, $c_u$ and $o_u$ mean the cyclic shift (CS) and orthogonal sequence (OS) allocated to each u-th UE.

$$s_{i,k,u} = e^{j2\pi c_u \frac{i}{12}} e^{j2\pi o_u \frac{k}{K}} \qquad \text{Equation 1}$$

Assuming that two users are multiplexed, the reception signals for the i-th tone and k-th symbol of UE u and UE v are as shown in Equation 2 below. In this case, $t_u$ and $f_u$ mean time offset and frequency offset of each UE u, and $t_v$ and $f_v$ mean time offset and frequency offset of each UE v. Here, the communication environment assumes an Additive White Gaussian Noise (AWGN) channel.

$$y_{i,k} = e^{j2\pi(c_u+t_u)\frac{i}{12}} e^{j2\pi(o_u+f_u)\frac{k}{K}} + e^{j2\pi(c_v+t_v)\frac{i}{12}} e^{j2\pi(o_v+f_v)\frac{k}{K}} + n_{i,k} \qquad \text{Equation 2}$$

The i-th tone and k-th symbol reception signals from which the CS and the OS are removed based on UE u are as shown in Equation 3 below.

$$y_{i,k} s_{i,k,u}^* =$$
$$e^{j2\pi t_u \frac{i}{12}} e^{j2\pi f_u \frac{k}{K}} + e^{j2\pi(c_v-c_u+t_v)\frac{i}{12}} e^{j2\pi(o_v-o_u+f_v)\frac{k}{K}} + n_{i,k} s_{i,k,u}^* \qquad \text{Equation 3}$$

Accumulating 12 tones of the frequency domain for User de-multiplexing is as shown in Equation 4 below.

$$\sum_{i=0}^{11} y_{i,k} s_{i,k,u}^* = e^{j2\pi f_u \frac{k}{K}} \sum_{i=0}^{11} e^{j2\pi t_u \frac{i}{12}} + \qquad \text{Equation 4}$$
$$e^{j2\pi(o_v-o_u+f_v)\frac{k}{K}} \sum_{i=0}^{11} e^{j2\pi(c_v-c_u+t_v)\frac{i}{12}} + \sum_{i=0}^{11} n_{i,k} s_{i,k,u}^*$$

Accumulating Time domain K symbol for User de-multiplexing is as shown in Equation 5 below.

$$\sum_{k=0}^{K-1}\sum_{i=0}^{11} y_{i,k} s_{i,k,u}^* = \sum_{k=0}^{K-1} e^{j2\pi f_u \frac{k}{K}} \sum_{i=0}^{11} e^{j2\pi t_u \frac{i}{12}} + \qquad \text{Equation 5}$$
$$\sum_{k=0}^{K-1} e^{j2\pi(o_v-o_u+f_v)\frac{k}{K}} \sum_{i=0}^{11} e^{j2\pi(c_v-c_u+t_v)\frac{i}{12}} + \sum_{k=0}^{K-1}\sum_{i=0}^{11} n_{i,k} s_{i,k,u}^*$$

In Equation 5 above, if there is no time offset and frequency offset of user v that acts as interference to target user u, the signal of user v becomes 0 as shown in Equation 6 below, so mutual interference does not exist.

$$\sum_{k=0}^{K-1} e^{j2\pi(o_v-o_u)\frac{k}{K}} \sum_{i=0}^{11} e^{j2\pi(c_v-c_u)\frac{i}{12}} = 0 \qquad \text{Equation 6}$$

However, in an actual communication environment, time offset and frequency offset exist, so the signal of user v does not become 0, so the interference of target user u works. Referring to Equation 6, it may be seen that the amount of interference between the CSs due to the time offset is adjusted by the CS intervals of user u and v, and in particular, in case that the CS intervals are large, the amount of interference is reduced. This shows the same characteristics in OS interference by frequency offset.

Accordingly, PUCCH reception performance may be improved by reducing interference of PUCCH signals received from different terminals by adjusting the interval between the OS and the CS set in each terminal in consideration of the communication environment between the actual base station and the terminal.

Hereinafter, an optimal resource allocation algorithm according to the situation of the terminal by adjusting the configuration of the OS and the CS will be described. The following optimal resource allocation algorithm is an embodiment, and any modification of this example is possible to set the OS and the CS in consideration of the communication situation between the base station and the terminal or time offset and frequency offset.

<Optimal Resource Allocation Algorithm>

As described above, in order to suppress interference between users allocated within the same RB as much as possible, the same OS or CS should not be allocated to users within the same RB as much as possible, and in case that the same OS or CS should be allocated inevitably due to an increase in the number of users in the same RB, it is advantageous to keep the OS or CS interval as wide as possible. To this end, the following algorithm is exemplified for allocating the CS and the OS for each user to keep the CS/OS interval as wide as possible.

When the maximum number of users to be allocated in the same RB is $N_{UE}$, OS, and CS length are each $L_{OS}$(≤7) and $L_{CS}$(=12), then $L_{OS} < L_{CS}$, so, first, the maximum number of users $N_{UE\_1OS}$ to be allocated per one OS may be obtained. The equation for obtaining the maximum number of users per 1OS may be calculated as shown in Equation 7.

$$N_{UE\_1OS} = \left\lceil \frac{N_{UE}}{L_{OS}} \right\rceil \text{ where } \lceil x \rceil \text{ means} \quad \text{Equation 7}$$

the least integer greater than or equal to $x$.

Next, the maximum CS interval allocated within the same OS may be calculated by using the maximum number of users to be allocated per one OS $N_{UE\_1Os}$ as shown in Equation 8 below.

$$I_{cs} = \left\lfloor \frac{12}{N_{UE\_1OS}} \right\rfloor \text{ where } \lfloor x \rfloor \text{ means} \quad \text{Equation 8}$$

the greatest integer less than or equal to $x$.

Thereafter, the n-th CS value $CS_{m,n}$ to be allocated to each m-th OS may be obtained by using the $I_{CS}$ interval as shown in Equation 9 below. In Equation 9 below, $Offset_m$ means the start offset of the CS configured to be allocated to the m-th OS, and may be used to reduce the use of the same CS for each OS as much as possible.

$$CS_{m,n} = (I_{CS}n + Offset_m) \bmod 12 \quad \text{Equation 9}$$

In other words, the CS is allocated for each $I_{CS}$ interval, but overlapping of the CS may be prevented by placing an offset according to the OS index.

Also, in case that only a small number of users are allocated, an exception may be made to the above algorithm to keep the CS interval as wide as possible. In other words, when 6 or less users are allocated, Equation 9 may not be applied by designating the CS value in advance regardless of the OS. For example, when 4 users are allocated, the CS is fixedly allocated to {0, 3, 6, 9} regardless of the number of OS allocations.

The algorithm described above is expressed in pseudo-code as shown in Table 9 below.

TABLE 9

INPUT PARAMETERS:
$N_{UE}$, $L_{OS}$
CONSTANT PRAMETERS:
$Offset_{Vector}$[12] = {5,3,4,3,0,5,5,5,5,5,5,5}
$Exception_{Vector}$[6][6]
= {{0,0,0,0,0,0},{0,6,0,0,0,0},{0,4,8,0,0,0},{0,3,6,9,0,0},{0,6,2,8,4,0}, {0,6,2,8,4,10}

TABLE 9-continued

CALCULATION:

$$N_{UE_{1OS}} = \left\lceil \frac{N_{UE}}{L_{OS}} \right\rceil$$

$$I_{CS} = \left\lfloor \frac{12}{N_{UE\_1OS}} \right\rfloor$$

k = 0
For m = 0 : $L_{OS}$ − 1
  If ((($N_{UE}$ − 1) mod $L_{OS}$) + 1) > m
    $N_{CS\_EachOS}$ = $N_{UE\_1OS}$
  Else
    $N_{CS\_EachOS}$ = $N_{UE\_1OS}$ − 1
  End
  $Offset_m$ = (Offset_Vector[$I_{CS}$ − 1] × m) mod 12
  For n = 0 : $N_{CS\_EachOS}$ − 1
    If $N_{UE}$ <= 6
      $OS_k$ = m
      $CS_k$ = $Exception_{Vector}$[$N_{UE}$][n]
    Else
      $OS_k$ = m
      $CS_k$ = ($I_{CS}$n + $Offset_m$) mod 12
    End
    k = k + 1
  End
End
OUTPUT PARAMETERS:
$OS_k$, $CS_k$ FIGS. 5, 6, 7, and 8 are diagrams illustrating resource allocation tables for OS and CS determined according to the number of terminals that are input values and OS lengths $N_{UE}$ and $L_{OS}$ based on the pseudo code described above according to various embodiments of the disclosure. The resource allocation tables of FIGS. 5 to 8 partially illustrate values obtained through the above-described example algorithm, wherein a value indicated by the OS may mean a timeDomainOCC value configured by a higher layer signal, and a value indicated by the CS may mean an initialCyclicShift value configured by a higher layer signal. In other words, the OS value denotes the index (i) of the spreading code shown in Table 4, and a base station may set the OS index and CS value for PUCCH format 1 in each terminal through the higher layer signal, and FIGS. 5 to 8 are examples of configuration values capable of minimizing interference between terminals.

The base station may directly allocate the OS and the CS by performing an operation according to the algorithm of the disclosure in consideration of the situation of the terminal, and a value obtained by a predetermined algorithm may be databased into a table of FIGS. 5 to 8, and the like, and resources may be allocated to each terminal by identifying the value stored in the table.

Meanwhile, the base station may know time offset and frequency offset generated in a communication environment between the base station and the terminal by measuring in advance. Therefore, the base station may increase the efficiency of the resource allocation by applying a resource allocation method that may suppress mutual resource interference as much as possible by comparing thresholds with calculated values such as the time offset, the frequency offset, and the like obtained in advance for the current situation of each terminal.

In a PUCCH environment where the time offset and the frequency offset exist, in case that resources are allocated for each user according to the method proposed in the disclosure, PUCCH reception performance may be improved, and DL throughput may be improved or cell coverage may be expanded through close loop power control target adjustment.

Hereinafter, the effect of the disclosure will be described through the results of identifying the difference in reception performance due to the difference in the resource allocation method within the same RB through simulation.

Assuming that the maximum number of users to be allocated within the same RB is $N_{UE}=4$, and the OS and CS lengths are $L_{OS}=3$ and $L_{CS}=12$, respectively, the resource allocation for each user is performed in several cases. The performance evaluation compared the false alarm occurrence probability in the terminal discontinuous transmission (DTX) situation. The reason for comparing the false alarm performance in the terminal DTX situation is to determine the interference amount of the interference user in the same RB, which shows similar results in error performance comparison.

<Simulation 1: In Case that the Same OS and CS Intervals are Allocated as 3, Table 10>

TABLE 10

| UE Num | OS | CS |
|---|---|---|
| 0 | 0 | 0 |
| 1 | 0 | 3 |
| 2 | 0 | 6 |
| 3 | 0 | 9 |

FIGS. 9, 10, 11, and 12 are diagrams illustrating a result of simulating communication between a base station and a plurality of terminals to identify an effect according to various embodiments of the disclosure.

The configuration of Table 10 is a case where the same OS is configured and CS intervals are equally distributed when there are 4 users. The false alarm occurrence probability in case of the resource allocation is set as shown in Table 10 was identified in the TDLC100+1TA time offset channel, and the result is as shown in FIG. 9. As may be identified in FIG. 9, it may be seen that the false alarm probability in the DTX situation increases as the interference signal transmission power increases. In other words, when the CS interval is 3, orthogonality between users is broken due to the effect of the time offset, and signal transmission between users allocated in the same RB affects mutual interference, increasing the false alarm probability of DTX users.

<Simulation 2: In Case that the OS is Made as Equal as Possible and the CS Interval is Increased to 6, Table 11>

TABLE 11

| UE Num | OS | CS |
|---|---|---|
| 0 | 0 | 0 |
| 1 | 0 | 6 |
| 2 | 1 | 0 |
| 3 | 2 | 0 |

The configuration of Table 11 is a case where three OSs are equally distributed to four users and the CS interval is maximized in case that the same OS is allocated.

In case of Simulation 2, performance analysis was performed on the same channel as Simulation 1 (TDLC100+1TA time offset channel), and the result is as shown in FIG. 10. As may be identified in FIG. 10, since the CS interval for each user is adjusted to 6, it may be identified that CS interference due to the time offset is alleviated.

However, in the same resource allocation environment, the same result as in FIG. 11 may be obtained in a channel (TDLC100+1TA time offset+500 Hz frequency offset) in which the frequency offset exists. As may be identified in FIG. 11, it may be seen that, like interference between CSs, performance is seriously degraded due to interference between OSs due to the added the frequency offset.

<Simulation 3: In Case that the Example Algorithm of the Disclosure is Applied, Table 12>

TABLE 12

| UE Num | OS | CS |
|---|---|---|
| 0 | 0 | 0 |
| 1 | 0 | 6 |
| 2 | 1 | 3 |
| 3 | 2 | 9 |

The configuration in Table 12 is the case in which the method of distributing the OS and the CS as far as possible according to the algorithm proposed in the disclosure is applied.

The result of simulation 3, in which the CS and OS intervals are set according to the algorithm proposed in the disclosure, is as shown in FIG. 12. In a channel where both the time offset and the frequency offset exist (TDLC100+1TA time offset+500 Hz frequency offset), when identifying the false alarm probability of the user being DTX, it can be seen that even if the signal power of users allocated within the same RB increases, the false alarm probability of the user who is DTX does not increase, but rather decreases. Compared with the values of simulations 1 and 2 shown in FIGS. 9 to 11, it can be identified that the false alarm probability is greatly improved even though the frequency offset is added.

Hereinafter, a PUCCH resource allocation method of the base station according to an embodiment of the disclosure will be described.

Figure 13:
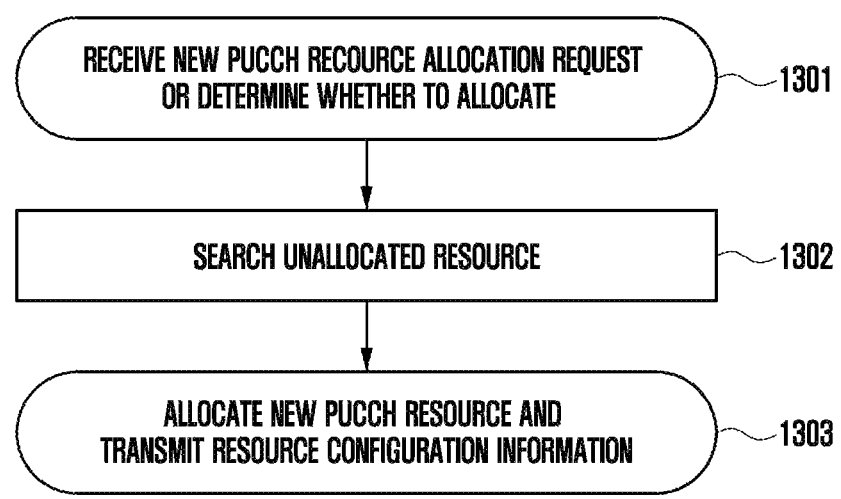
FIG. 13 is a diagram illustrating a procedure in which a base station allocates a new PUCCH resource to a terminal according to an embodiment of the disclosure.

FIG. 13 is a diagram illustrating a procedure in which a base station allocates a new PUCCH resource to a terminal according to an embodiment of the disclosure.

Referring to FIG. 13, in case that the base station receives a new PUCCH resource allocation request from the terminal or in case that it is necessary to allocate the new PUCCH resource to the terminal in operation 1301, it may identify whether there is unallocated remaining resource in operation 1302.

Through operation 1302, in case that there is an unallocated resource, it may be allocated as a resource for the new PUCCH, and such resource configuration information may be transmitted to the terminal in operation 1303.

Figure 14:
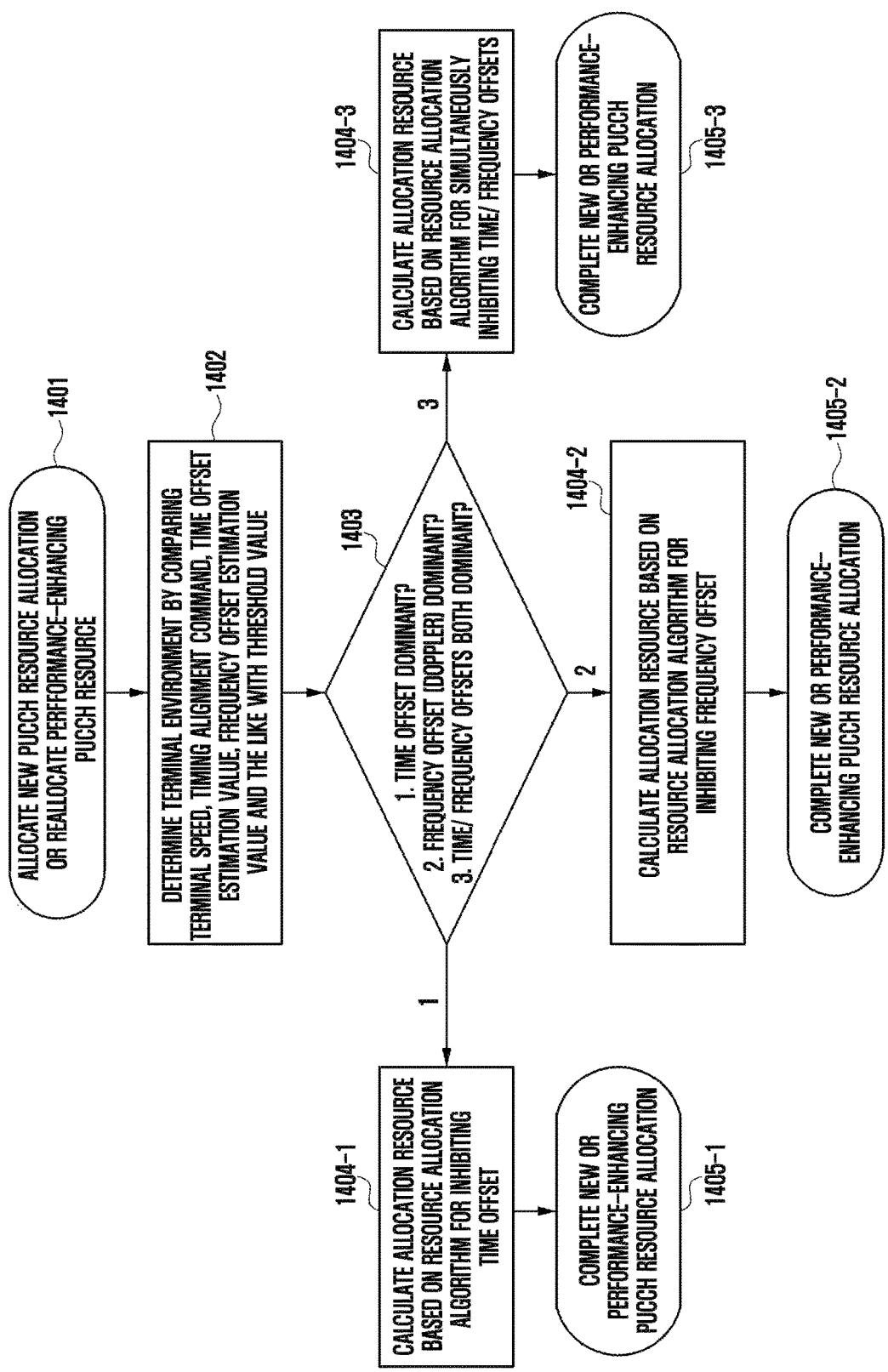
FIG. 14 is a diagram illustrating a process in which a base station determines a communication environment to apply a resource allocation algorithm according to an embodiment of the disclosure.

FIG. 14 is a diagram illustrating a process in which a base station determines a communication environment to apply a resource allocation algorithm according to an embodiment of the disclosure.

Referring to FIG. 14, when the base station allocates a new PUCCH resource or reallocates the PUCCH resource to improve PUCCH reception performance 1401, it may consider the communication environment between the base station and the terminal 1402. Whether to allocate a new resource or reallocate a PUCCH resource may be triggered by a request of the terminal or a determination of the base station.

The base station may determine the current situation of the terminal in order to consider the communication environment between the terminals 1402. As a method for determining the situation of the terminal, the base station may identify timing alignment command information between the base station and the terminal, movement speed of the terminal, time offset information, frequency offset information, and the like, and may determine the current situation of the terminal by comparing each identified value with a preset threshold.

In order to determine the terminal environment, the base station may receive a signal for determining environment information from the terminal, and the signal received by the base station from the terminal may include a demodulation reference signal (DMRS), a sounding reference signal (SRS), a channel state information-reference signal (CSI-RS), or measurement information for the terminal to report to the base station.

In operation 1403, the base station may identify whether the time offset is dominant, the frequency offset is dominant, or both the time offset and the frequency offset are dominant by identifying the environment of the terminal.

Afterwards, through operations 1404-1 to 1404-3, CS and OS values may be set in consideration of the resource allocation suitable for each situation. In other words, in case that the time offset is dominant, an algorithm for suppressing the time offset may be applied, and a resource applying an algorithm for maximizing the CS interval may be allocated 1405-1. Similarly, in case that the frequency offset is dominant, a resource applied with an algorithm for maximizing the OS interval may be allocated in order to suppress the frequency offset 1405-2, and in case that both the time offset and the frequency offset are to be considered, resources to which the resource allocation algorithm exemplified in the disclosure for maximizing the CS/OS interval is applied may be allocated in order to simultaneously suppress them 1405-3.

Figure 15:
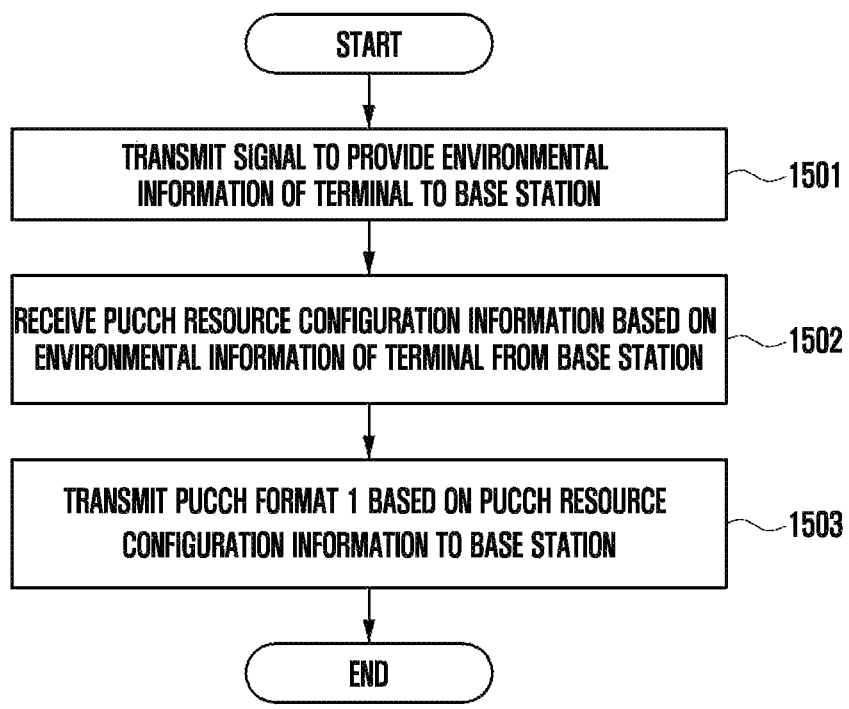
FIG. 15 is a diagram illustrating a process in which a terminal gets a PUCCH resource configuration from a base station and transmits the PUCCH according to an embodiment of the disclosure.

FIG. 15 is a diagram illustrating a process in which a terminal gets a PUCCH resource configuration from a base station and transmits the PUCCH according to an embodiment of the disclosure.

Referring to FIG. 15, the terminal may transmit a signal for providing environment information of the terminal to the base station 1501. The environment information may include timing alignment command information, movement speed of the terminal, time offset information, and frequency offset information. The signal may include a demodulation reference signal (DMRS), a sounding reference signal (SRS), a channel state information-reference signal (CSI-RS), or measurement information for the terminal to report to the base station. The base station may identify the environment information of the terminal based on the signal received from the terminal, and apply an algorithm for allocating an appropriate PUCCH resource.

The terminal may receive PUCCH resource configuration information determined based on the environment information of the terminal from the base station 1502. The PUCCH resource configuration information may include OS and CS configuration values. The OS and CS configuration values may be determined by considering the time offset and/or the frequency offset based on environment information of the terminal.

The terminal may transmit PUCCH format 1 to the base station based on PUCCH format 1 configuration information included in the PUCCH resource configuration information received from the base station 1503.

Figure 16:
FIG. 16 is a diagram illustrating a structure of a base station according to an embodiment of the disclosure.

FIG. 16 is a diagram illustrating a structure of a base station according to an embodiment of the disclosure.

Referring to FIG. 16, the base station may include a transceiver 1602, a base station control unit 1604, and a storage unit 1606. In the disclosure, the base station control unit may be defined as a circuit or application-specific integrated circuit or at least one processor.

The transceiver 1602 may transmit and receive signals to and from another network entity. For example, the transceiver may transmit system information to the terminal, and may transmit a synchronization signal, a reference signal, or a higher layer signal.

The base station control unit 1604 may control the overall operation of the base station according to the embodiment proposed in the disclosure. For example, the base station control unit may control operations proposed in the disclosure to manage and reduce interference between terminals. Specifically, the base station control unit may determine the environment of the terminal based on the information received from the terminal, determine a configuration value capable of minimizing interference upon reception of a PUCCH resource accordingly, and set it to the terminal.

The storage unit 1606 may store at least one of information transmitted and received through the transceiver 1602 and information generated through the base station control unit 1604.

Figure 17:
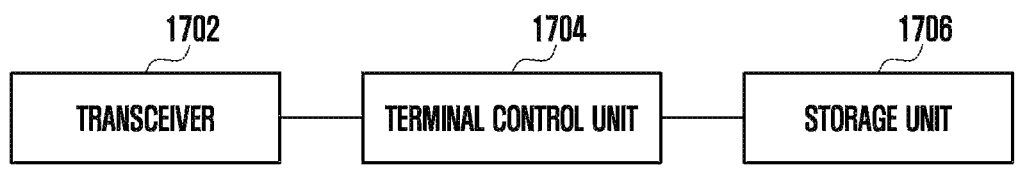
FIG. 17 is a diagram illustrating a structure of a terminal according to an embodiment of the disclosure.

FIG. 17 is a diagram illustrating a structure of a terminal according to an embodiment of the disclosure.

Referring to FIG. 17, a terminal may include a transceiver 1702, a terminal control unit 1704, and a storage unit 1706. In the disclosure, the terminal control unit may be defined as a circuit or an application-specific integrated circuit or at least one processor.

The transceiver 1702 may transmit and receive signals to and from another network entity. For example, the transceiver may receive system information from the base station, may receive a synchronization signal, a reference signal, and a higher layer signal, and may transmit a signal for providing environment information of the terminal to the base station.

The terminal control unit 1704 may control overall operation of the terminal according to an embodiment proposed in the disclosure. For example, the terminal control unit may control signal flow between blocks to perform the operation according to the above-described drawing and flowchart. Specifically, the terminal control unit may operate according to a control signal from the base station and may exchange a message or a signal with the terminal and/or the base station.

The storage unit 1706 may store at least one of information transmitted and received through the transceiver and information generated through the terminal control unit.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
    determining a cyclic shift (CS) interval between CSs for terminals based on a number of orthogonal codes (OCs), a number of CSs, and a number of terminals to be allocated for a physical uplink control channel (PUCCH) resource;
    determining a CS for a terminal among the terminals based on the CS interval;

transmitting, to the terminal, PUCCH resource configuration information for a PUCCH format 1, indicating the CS for the terminal; and receiving, from the terminal, the PUCCH format 1 based on the PUCCH resource configuration information.

2. The method of claim 1, further comprising:

receiving, from the terminal, environment information of the terminal; and determining the PUCCH configuration information based on the environment information, wherein the environment information of the terminal includes at least one of timing alignment command information, movement speed of the terminal, time offset information between the base station and the terminal, or frequency offset information between the base station and the terminal.

3. The method of claim 1, wherein the PUCCH resource configuration information further indicates an OS for the terminal.

4. The method of claim 3, wherein the CS for the terminal is determined based on the CS interval and an offset for the OS.

5. A method performed by a terminal in a wireless communication system, the method comprising:

receiving, from a base station, a physical uplink control channel (PUCCH) resource configuration information for a PUCCH format 1, indicating a cyclic shift (CS) for the terminal; and transmitting, to the base station, the PUCCH format 1 based on the PUCCH resource configuration information, wherein the CS for the terminal among terminals is determined based on a CS interval, and wherein the CS interval between CSs for the terminals is determined based on a number of orthogonal codes (OCs), a number of CSs, and a number of terminals to be allocated for a PUCCH resource.

6. The method of claim 5, further comprising:

transmitting, to the base station, environment information of the terminal, wherein the environment information of the terminal includes at least one of timing alignment command information, movement speed of the terminal, time offset information between the base station and the terminal, or frequency offset information between the base station and the terminal.

7. The method of claim 5, wherein the PUCCH resource configuration information further indicates an OS for the terminal.

8. A base station in a wireless communication system, the base station comprising:

a transceiver for transmitting and receiving a signal;

memory storing instructions; and at least one processor, wherein the instructions, when executed by the at least one processor, cause the base station to:

determine a cyclic shift (CS) interval between CSs for terminals based on a number of orthogonal codes (OCs), a number of CSs, and a number of terminals to be allocated for a physical uplink control channel (PUCCH) resource, determine a CS for a terminal among the terminals based on the CS interval, transmit, to the terminal, PUCCH resource configuration information for a PUCCH format 1, indicating the CS for the terminal, and receive, from the terminal, the PUCCH format 1 based on the PUCCH resource configuration information.

9. The base station of claim 8, wherein the instructions, when executed by the at least one processor, cause the base station to:

receive, from the terminal, environment information of the terminal; and determine the PUCCH configuration information based on the environment information, wherein the environment information of the terminal includes at least one of timing alignment command information, movement speed of the terminal, time offset information between the base station and the terminal, or frequency offset information between the base station and the terminal.

10. The base station of claim 8, wherein the PUCCH resource configuration information further indicates an OS for the terminal.

11. The base station of claim 10, wherein the CS for the terminal is determined based on the CS interval and an offset for the OS.

12. A terminal in a wireless communication system, the terminal comprising:

a transceiver for transmitting and receiving a signal;

memory storing instructions; and at least one processor, wherein the instructions, when executed by the at least one processor, cause the terminal to:

receive, from a base station, a physical uplink control channel (PUCCH) resource configuration information for a PUCCH format 1, indicating a cyclic shift (CS) for the terminal, and transmit, to the base station, the PUCCH format 1 based on the PUCCH resource configuration information, wherein the CS for the terminal among terminals is determined based on a CS interval, and wherein the CS interval between CSs for the terminals is determined based on a number of orthogonal codes (OCs), a number of CSs, and a number of terminals to be allocated for a PUCCH resource.

13. The terminal of claim 12, wherein the instructions, when executed by the at least one processor, cause the terminal to transmit, to the base station, environment information of the terminal, and wherein the environment information of the terminal includes at least one of timing alignment command information, movement speed of the terminal, time offset information between the base station and the terminal, or frequency offset information between the base station and the terminal.

14. The terminal of claim 13, wherein the PUCCH resource configuration information further indicates an OS for the terminal.

15. The terminal of claim 14, wherein the CS for the terminal is determined based on the CS interval and an offset for the OS.

* * * * *